(12) United States Patent
Shima

(10) Patent No.: US 7,803,487 B2
(45) Date of Patent: Sep. 28, 2010

(54) NON-AQUEOUS LIQUID ELECTROLYTE AND NON-AQUEOUS LIQUID ELECTROLYTE SECONDARY BATTERY USING THE SAME

(75) Inventor: Noriko Shima, Ibaraki (JP)

(73) Assignee: Mitsubishi Chemical Corporation, Tokyo (JP)

( * ) Notice: Subject to any disclaimer, the term of this patent is extended or adjusted under 35 U.S.C. 154(b) by 12 days.

(21) Appl. No.: 11/955,692

(22) Filed: Dec. 13, 2007

(65) Prior Publication Data

US 2008/0102375 A1 May 1, 2008

Related U.S. Application Data

(63) Continuation of application No. PCT/JP2006/309423, filed on May 10, 2006.

(30) Foreign Application Priority Data

Jun. 23, 2005 (JP) ............... 2005-183846

(51) Int. Cl.
*H01M 4/58* (2010.01)
(52) U.S. Cl. .................. 429/331; 429/188; 429/199
(58) Field of Classification Search ................ 429/331
See application file for complete search history.

(56) References Cited

U.S. PATENT DOCUMENTS

| | | | |
|---|---|---|---|
| 5,626,981 A | 5/1997 | Simon et al. | |
| 6,221,534 B1 | 4/2001 | Takeuchi et al. | |
| 6,350,546 B1 | 2/2002 | Gan et al. | |
| 6,511,774 B1 | 1/2003 | Tsukuda et al. | |

| | | | |
|---|---|---|---|
| 2003/0118914 A1 | 6/2003 | Mori | |
| 2004/0151987 A1 | 8/2004 | Kawase et al. | |

FOREIGN PATENT DOCUMENTS

| | | |
|---|---|---|
| EP | 1 005 098 A2 | 5/2000 |
| EP | 1 005 098 A3 | 5/2000 |
| JP | 8-45545 | 2/1996 |
| JP | 11-176470 | 7/1999 |
| JP | 11-195429 | 7/1999 |
| JP | 2000-40526 | 2/2000 |
| JP | 2000-164251 | 6/2000 |
| JP | 2001-176548 | 6/2001 |
| JP | 2002-8719 | 1/2002 |
| JP | 2003-217656 | 7/2003 |
| JP | 2004-87284 | 3/2004 |
| WO | 98/32184 | 7/1998 |

OTHER PUBLICATIONS

Maas et al. Chemical Communication, 6,437-438, 2000.*
Barrett, et al. Jo. Org. Chem., 1985, 50, 169-175.*

* cited by examiner

*Primary Examiner*—Melvin C Mayes
*Assistant Examiner*—Yun Qian
(74) *Attorney, Agent, or Firm*—Oblon, Spivak, McClelland, Maier & Neustadt, L.L.P.

(57) ABSTRACT

A non-aqueous liquid electrolyte secondary battery comprising an anode electrode and a cathode electrode, capable of intercalating and deintercalating lithium ions, and a non-aqueous liquid electrolyte, having high charging capacity, capable of maintaining excellent characteristics over a long period of time and excellent in discharge capacity retention in particular, is provided. The non-aqueous liquid electrolyte contains at least, at least, a carbonate having at least either an unsaturated bond or a halogen atom, and a compound of formula (III-1) A-N=C=O where A represents an element or group other than a hydrogen.

13 Claims, No Drawings

NON-AQUEOUS LIQUID ELECTROLYTE AND NON-AQUEOUS LIQUID ELECTROLYTE SECONDARY BATTERY USING THE SAME

TECHNICAL FIELD

The present invention relates to a non-aqueous liquid electrolyte and non-aqueous liquid electrolyte secondary battery using the same.

BACKGROUND ART

Recently, with the reduction in weight and size of electrical appliances, development of a non-aqueous liquid electrolyte secondary battery having high energy density, for example lithium secondary battery, has been advanced. Also, as application field of lithium secondary battery is expanded, further improvement in its battery characteristics has been desired.

In this situation, a secondary battery based on metal lithium as anode electrode has been studied as a battery capable of achieving higher capacity. However, there is a problem that metal lithium grows as dendrite on repeated charges and discharges, and when this reaches the cathode electrode, shortings in the battery occurs. This has been the greatest obstacle in realizing a lithium secondary battery based on metal lithium as anode electrode.

On the other hand, a non-aqueous liquid electrolyte secondary battery has been proposed, in which carbonaceous material capable of intercalating and deintercalating lithium, such as coke, artificial graphite or natural graphite, are used for the anode electrode in place of metal lithium. In such a non-aqueous liquid electrolyte secondary battery, growth of metal lithium as dendrite can be avoided and battery life and safety can be improved. When graphite of these kinds are used as anode electrode, capacity is known to be usually of the order of 300 mAh·g$^{-1}$, 500 mAh·cm$^{-3}$.

Recently, proposals have been made for the anode electrode active material based on simple metal element capable of forming an alloy with lithium such as Si, Sn and Pb, an alloy containing at least one of these metal elements, or metal compound containing these metal elements (hereafter referred to as "anode electrode active material containing Si, Sn, Pb and the like", as appropriate). The capacity of these materials per unit volume is of the order of 2000 mAh·cm$^{-3}$ or larger, which is about 4 times or even larger than that of graphite. Therefore, higher capacity is obtained by using these materials.

Although a secondary battery using anode electrode active material containing Si, Sn, Pb and the like is suitable for realizing higher capacity, there is a decrease in safety, and anode electrode active material deteriorates on repeated charges and discharges, leading to reduced charge-discharge efficiency and deterioration of cycle characteristics.

Therefore, in order to secure safety and prevent a decrease in discharge capacity, a proposal has been made to include cyclic carbonate ester or a polymer of carbonate ester and phosphoric acid triester in the non-aqueous liquid electrolyte used for a secondary battery (Patent Document 1). Furthermore, a proposal has been made to add, in the non-aqueous liquid electrolyte, a heterocyclic compound having sulfur atom and/or oxygen atom in the ring structure and to form a protective layer on the surface of the anode electrode active material, thus improving charge-discharge cycle characteristics (Patent Document 2).

Furthermore, for a non-aqueous liquid electrolyte secondary battery based on various anode electrode material, a liquid electrolyte was proposed to which various compounds are added in addition to its electrolyte and main solvent, in order to improve such characteristics as load characteristics, cycle characteristics, storage characteristics and low-temperature characteristics.

For example, in order to suppress decomposition of liquid electrolyte of a non-aqueous liquid electrolyte secondary battery based on graphite anode electrode, a carbonate derivative having an unsaturated bond has been proposed such as an liquid electrolyte containing vinylene carbonate and its derivative (for example, Patent Document 3), or a liquid electrolyte containing ethylene carbonate derivative having non-conjugated unsaturated bond in its side chain (for example, Patent Document 4).

In the liquid electrolyte containing these compounds, the above-mentioned compounds are reduced and decomposed on the surface of the anode electrode and a protective layer is formed, which inhibits excessive decomposition of the liquid electrolyte. A halogen-containing carbonate was also proposed for the same purpose (for example Patent Document 5).

[Patent Document 1] Japanese Patent Application Laid-Open Publication No. H11-176470

[Patent Document 2] Japanese Patent Application Laid-Open Publication No. 2004-87284

[Patent Document 3] Japanese Patent Application Laid-Open Publication No. H8-45545

[Patent Document 4] Japanese Patent Application Laid-Open Publication No. 2000-40526

[Patent Document 5] Japanese Patent Application Laid-Open Publication No. H11-195429

DISCLOSURE OF THE INVENTION

Problem to Be Solved by the Invention

Previous secondary batteries described in Patent Documents 1 and 2 use an element such as Si as anode electrode material. Although high capacity was thereby obtained, they were inadequate with respect to performance on longer-term charge-discharge cycle and, especially, discharge capacity retention discharge capacity retention.

Technologies descried in Patent Documents 3 to 5 were also inadequate with respect to cycle characteristics (discharge capacity retention discharge capacity retention). Therefore, further improvement in cycle characteristics (discharge capacity retention) is urgently needed for non-aqueous liquid electrolyte secondary battery based on various anode electrode material.

The present invention has been made to solve the above problems.

Namely, a purpose of the present invention is to provide a non-aqueous liquid electrolyte secondary battery, having high charging capacity, capable of maintaining excellent characteristics over a long period of time and excellent in cycle characteristics (discharge capacity retention) in particular, and a non-aqueous liquid electrolyte to be used for it, in a non-aqueous liquid electrolyte secondary battery based on a anode electrode active material having at least one kind of atom selected from the group consisting of Si atom, Sn atom and Pb atom.

Another purpose of the present invention is to provide a non-aqueous liquid electrolyte secondary battery, having high charging capacity, capable of maintaining excellent characteristics over a long period of time and excellent in cycle characteristics (discharge capacity retention) in particular, and a non-aqueous liquid electrolyte to be used for it, in a non-aqueous liquid electrolyte secondary battery which uses various materials such as graphite as anode electrode active material.

Means for Solving the Problem

The present inventors made an extensive effort to solve the above problems and have found that it is possible to solve the problems by incorporating in the non-aqueous liquid electrolyte a carbonate having at least either an unsaturated bond or a halogen atom and at least one component of (i) to (iii) described later (specific component), in a non-aqueous liquid electrolyte secondary battery based on a anode electrode active material having at least one kind of atom selected from the group consisting of Si atom, Sn atom and Pb atom. It was also found that component (i) and component (ii) are effective without being combined with the specific carbonate, and that the effect of component (iii) is not limited to the secondary battery which uses the above specific anode electrode active material but the same effect is also exhibited for the secondary battery based on various anode electrode active material such as graphite material. These findings led to the completion of the present invention.

One subject matter of the present invention is a non-aqueous liquid electrolyte to be used for a non-aqueous liquid electrolyte secondary battery comprising a anode electrode and a cathode electrodecathode electrode, capable of intercalating and deintercalating lithium ions, and the non-aqueous liquid electrolyte, the anode electrode containing a anode electrode active material having at least one kind of atom selected from the group consisting of Si atom, Sn atom and Pb atom, wherein said non-aqueous liquid electrolyte contains a carbonate having at least either an unsaturated bond or a halogen atom, and also contains at least one of: (i) a compound represented by the general formula (I) below and a saturated cyclic carbonate compound; (ii) a compound represented by the general formula (II) below; and (iii) a compound represented by the general formula (III-1) below.

[Chemical Formula 1]

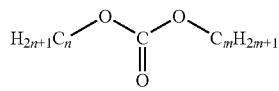
(I)

(In the above formula (I), n represents an integer which is greater than or equal to 3, m represents an integer which is greater than or equal to 1, and the sum of n and m is greater than or equal to 5. All or part of the hydrogen atoms may be substituted with a fluorine atom.)

[Chemical Formula 2]

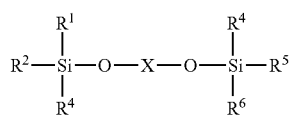
(II)

(In the above formula (II), X represents a group represented by

[Chemical Formula 3]

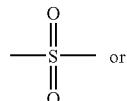 or

[Chemical Formula 4]

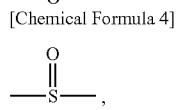

and $R^1$ to $R^6$ each represent, independently of each other, an unsubstituted alkyl group or halogen-substituted alkyl group.)

[Chemical Formula 5]

$$A\text{-}N{=}C{=}O \quad \quad \text{(III-1)}$$

(In the above formula (III-1), A represents an element or group other than a hydrogen.)

It is preferable that, in the above general formula (I), n and m are integers different from each other.

It is preferable that, in said non-aqueous liquid electrolyte, the concentration of said compound represented by the general formula (I) is 5 volume % or higher, and 95 volume % or lower.

It is preferable that, in said non-aqueous liquid electrolyte, the concentration of said saturated cyclic carbonate is 5 volume % or higher, and 50 volume % or lower.

It is preferable that, in the above general formula (II), $R^1$ to $R^6$ each represent, independently of each other, an unsubstituted or fluorine-substituted alkyl group having 1 to 3 carbon atoms.

It is preferable that, in said non-aqueous liquid electrolyte, the concentration of said compound represented by the general formula (II) is 0.01 weight % or higher, and 10 weight % or lower.

It is preferable that said compound represented by the general formula (III-1) is a compound selected from the compounds represented by the general formula (III-2) below.

[Chemical Formula 6]

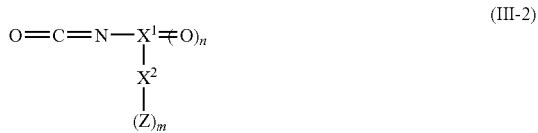
(III-2)

(In the above general formula (III-2), $X^1$ and $X^2$ represent, independently of each other, an element other than hydrogen, Z represents an arbitrary element or group, m and n represent, independently of each other, an integer greater than or equal to 1, and when m is 2 or greater, each of Z may be the same or different from each other.)

It is preferable that said compound represented by the general formula (III-1) is a compound selected from the compounds represented by the general formula (III-3) below.

[Chemical Formula 7]

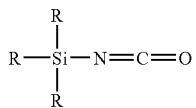
(III-3)

(In the above general formula (III-3), R represents, independently of each other, an alkyl group or aryl group that may have a substituent. In addition, more than one R may be connected to each other to form a ring.)

It is preferable that, in said non-aqueous liquid electrolyte, the concentration of said compound represented by the general formula (III-1) is 0.01 weight % or higher, and 10 weight % or lower.

It is preferable that, in said non-aqueous liquid electrolyte, the concentration of said carbonate having at least either an unsaturated bond or a halogen atom is 0.01 weight % or higher, and 70 weight % or lower.

It is preferable that said carbonate having an unsaturated bond or a halogen atom is one or more carbonates selected from the group consisting of vinylene carbonate, vinylethylene carbonate, fluoroethylene carbonate, difluoroethylene carbonate and derivatives of these compounds.

It is preferable that it further comprises ethylene carbonate and/or propylene carbonate.

It is preferable that it further comprises at least one additional carbonate selected from the group consisting of dimethyl carbonate, ethylmethyl carbonate, diethyl carbonate, methyl-n-propyl carbonate, ethyl-n-propyl carbonate and di-n-propyl carbonate.

Another subject matter of the present invention is a non-aqueous liquid electrolyte to be used for a non-aqueous liquid electrolyte secondary battery comprising a anode electrode and a cathode electrodecathode electrode, capable of intercalating and deintercalating lithium ions, and the non-aqueous liquid electrolyte, the anode electrode containing a anode electrode active material having at least one kind of atom selected from the group consisting of Si atom, Sn atom and Pb atom, wherein said non-aqueous liquid electrolyte contains a compound represented by the general formula (I) below and a saturated cyclic carbonate.

[Chemical Formula 8]

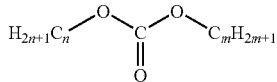
(I)

(In the above formula (I), n represents an integer which is greater than or equal to 3, m represents an integer which is greater than or equal to 1, and the sum of n and m is greater than or equal to 5.

All or part of the hydrogen atoms may be substituted with a fluorine atom.)

It is preferable that, in the above general formula (I), n and m are integers different from each other.

It is preferable that, in said non-aqueous liquid electrolyte, the concentration of said compound represented by the general formula (I) is 5 volume % or higher, and 95 volume % or lower.

It is preferable that, in said non-aqueous liquid electrolyte, the concentration of said saturated cyclic carbonate is 5 volume % or higher, and 50 volume % or lower.

Still another subject matter of the present invention is a non-aqueous liquid electrolyte to be used for a non-aqueous liquid electrolyte secondary battery comprising a anode electrode and a cathode electrodecathode electrode, capable of intercalating and deintercalating lithium ions, and the non-aqueous liquid electrolyte, the anode electrode containing a anode electrode active material having at least one kind of atom selected from the group consisting of Si atom, Sn atom and Pb atom, wherein said non-aqueous liquid electrolyte contains at least a compound represented by the general formula (II) below.

[Chemical Formula 9]

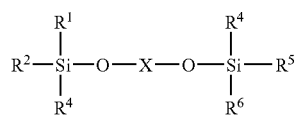
(II)

(In the above formula (II),
X represents a group represented by

[Chemical Formula 10]

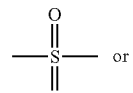 or

[Chemical Formula 11]

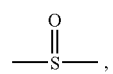, and $R^1$ to $R^6$ each represent, independently of each other, an unsubstituted alkyl group or halogen-substituted alkyl group.)

It is preferable that, in the above general formula (II), $R^1$ to $R^6$ each represent, independently of each other, an unsubstituted or fluorine-substituted alkyl group having 1 to 3 carbon atoms.

It is preferable that, in said non-aqueous liquid electrolyte, the concentration of said compound represented by the formula (II) is 0.01 weight % or higher, and 10 weight % or lower.

Still another subject matter of the present invention is a non-aqueous liquid electrolyte secondary battery comprising a anode electrode and a cathode electrodecathode electrode, capable of intercalating and deintercalating lithium ions, and a non-aqueous liquid electrolyte, the anode electrode containing a anode electrode active material having at least one kind of atom selected from the group consisting of Si atom, Sn atom and Pb atom, wherein said non-aqueous liquid electrolyte is a non-aqueous liquid electrolyte defined above.

Still another subject matter of the present invention is a non-aqueous liquid electrolyte to be used for a non-aqueous liquid electrolyte secondary battery comprising a anode electrode and a cathode electrodecathode electrode, capable of intercalating and deintercalating lithium ions, and the non-aqueous liquid electrolyte, wherein said non-aqueous liquid electrolyte contains, at least, a carbonate having at least either an unsaturated bond or a halogen atom, and a compound represented by the general formula (III-1) below.

[Chemical Formula 12]

$$A\text{-}N=C=O \quad (III\text{-}1)$$

(In the above formula (III-1), A represents an element or group other than a hydrogen.)

It is preferable that said compound represented by the general formula (III-1) is a compound selected from the group represented by the general formula (III-2) below.

[Chemical Formula 13]

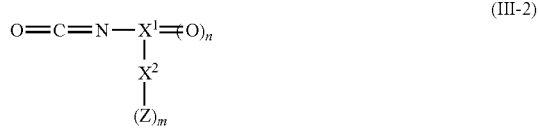

$$O=C=N-X^1\!\!=\!\!O)_n \quad (III\text{-}2)$$
$$\begin{array}{c} | \\ X^2 \\ | \\ (Z)_m \end{array}$$

(In the above general formula (III-2), $X^1$ and $X^2$ represent, independently of each other, an element other than hydrogen, Z represents an arbitrary element or group, m and n represent, independently of each other, an integer greater than or equal to 1, and when m is 2 or greater, each of Z may be the same or different from each other.)

It is preferable that said compound represented by the general formula (III-1) is a compound selected from the group represented by the general formula (III-3) below.

[Chemical Formula 14]

$$\begin{array}{c} R \\ | \\ R-Si-N=C=O \\ | \\ R \end{array} \quad (III\text{-}3)$$

(In the above general formula (III-3),

R represents, independently of each other, an alkyl group or aryl group that may have a substituent. In addition, more than one R may be connected to each other to form a ring.)

It is preferable that, in said non-aqueous liquid electrolyte, the concentration of said compound represented by the general formula (III-1) is 0.01 weight % or higher, and 10 weight % or lower.

Still another subject matter of the present invention is a non-aqueous liquid electrolyte secondary battery comprising a anode electrode and a cathode electrodecathode electrode, capable of intercalating and deintercalating lithium ions, and a non-aqueous liquid electrolyte, wherein said non-aqueous liquid electrolyte is a non-aqueous liquid electrolyte defined above.

Advantageous Effects of the Invention

The non-aqueous liquid electrolyte secondary battery of the present invention has high charge capacity and maintains an excellent property over a long period. It is excellent especially in discharge capacity retention.

BEST MODES FRCARRYING OUT THE INVENTION

The present invention will be explained in detail below. The explanation given below indicates one example of each aspect of the invention (representative example) and by no means restrictive. Any modifications can be added thereto insofar as they do not depart from the scope of the invention.

[I. First Non-aqueous Liquid Electrolyte]

First, explanation will be given on the non-aqueous liquid electrolyte related to the first subject of the present invention (hereafter referred to as "first non-aqueous liquid electrolyte of the present invention" as appropriate).

The first non-aqueous liquid electrolyte of the present invention is the non-aqueous liquid electrolyte to be used for a non-aqueous liquid electrolyte secondary battery comprising a anode electrode and a cathode electrode, capable of intercalating and deintercalating lithium ions, and a non-aqueous liquid electrolyte, the anode electrode containing a anode electrode active material having at least one kind of the atom selected from the group consisting of Si atom, Sn atom and Pb atom.

The first non-aqueous liquid electrolyte of the present invention usually comprises, as its main components, an electrolyte and non-aqueous solvent to dissolve it, similarly to a non-aqueous liquid electrolyte generally used. It further comprises at least one of the components of (i) to (iii) described later (hereafter referred to as "specific component" as appropriate), and a carbonate having at least either an unsaturated bond or a halogen atom (hereafter referred to as "specific carbonate" as appropriate). It may contain other components such as an additive.

In the following description, explanation will be given, first, on the specific component and specific carbonate, followed by the electrolyte and the non-aqueous solvent. Other components will also be touched upon.

[I-1. Specific Component]

The specific component of the present invention is at least one of the components of (i) to (iii) described below.

Component (i): a compound represented by the general formula (I) described later and a saturated cyclic carbonate compound.

Component (ii): a compound represented by the general formula (II) described later.

Component (iii): a compound represented by the general formula (III-1) described later.

In the following description, an effort will be made to make the explanation easier. When it is necessary to differentiate the first non-aqueous liquid electrolytes of the present invention containing component (i), component (ii) and component (iii), they will be referred to as "non-aqueous liquid electrolyte (I)", "non-aqueous liquid electrolyte (II)" and "non-aqueous liquid electrolyte (III)", respectively. When no differentiation is necessary, they will be referred to simply as "first non-aqueous liquid electrolyte of the present invention".

The first non-aqueous liquid electrolyte of the present invention may contain any one of the components of (i) to (iii) singly, or may contain two or more components in any combination and in any ratio. Therefore, when reference is made to "non-aqueous liquid electrolyte (I)", it is to be understood that it implies not only the solution containing component (i) alone but also the solution further containing component (ii) and/or component (iii). The same applies to the other cases.

In the following, components (i) to (iii) will be explained.

<I-1-1. Component (i)>

Component (i) is a combination of a compound represented by the general formula (I) described later (hereinafter abbreviated as "specific compound (I)" as appropriate) and a saturated cyclic carbonate compound.

I-1-1a. Specific Compound (I):

Specific compound (1) is a linear carbonate linear carbonate represented by the general formula (I) below.

[Chemical Formula 15]

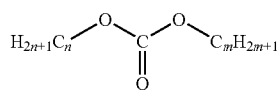

(In the above formula (I), n represents an integer which is greater than or equal to 3, m represents an integer which is greater than or equal to 1, and the sum of n and m is greater than or equal to 5. All or part of the hydrogen atoms may be substituted with a fluorine atom.)

In the general formula (I) above, the number of carbon atoms n in the group —$C_nH_{2n+1}$ (hereafter referred to "first substituent" as appropriate) is usually 3 or more, and usually 6 or less, preferably 5 or less. When n exceeds this upper limit, the viscosity of the non-aqueous liquid electrolyte tends to increase.

When the number of carbon atoms n of the first substituent is 3 or more, chemical reactivity of the linear carbonate linear carbonate towards anode electrode active material containing the above-mentioned metal elements becomes lower, leading to inhibition of cycle deterioration. This is the reason the number of carbon atoms n in the first substituent of the present invention is set to be 3 or more. Carbonates with small molecular weight are highly reactive chemically and cycle deterioration is liable to occur as a result of a side reaction. Linear carbonate Linear carbonates having the first substituent whose n is 3 or more are high enough in molecular weight and the above difficulty is reduced.

Concrete examples of the first substituent are: n-propyl group, i-propyl group, n-butyl group, t-butyl group, n-pentyl group, 1-methylbutyl group, 2-methylbutyl group, 3-methylbutyl group, 1,2-dimethylpropyl group, 1-ethylproyl group, n-hexyl group, 1-methylpentyl group, 2-methylpentyl group, 3-methylpentyl group, 4-methylpentyl group, 1,2-dimethylbutyl group, 1,3-dimethylbutyl group, 2,3-dimethylbutyl group, 2-ethylbutyl group and 3-ethylbutyl group.

Of these, preferable are n-propyl group, n-butyl group and n-hexyl group.

On the other hand, in the general formula (I) above, the number of carbon atoms m of the group —$C_mH_{2m+1}$ (hereafter referred to "second substituent" as appropriate) is usually 1 or more, and the sum of n and m is an integer which is usually 5 or more and preferably 9 or less, more preferably 7 or less. When the sum n+m is below this range, the chemical reactivity of the linear carbonate becomes high due to its small molecular weight and cycle deterioration tends to occur as a result of a side reaction. If the sum n+m exceeds the upper limit, the solute does not dissolve easily, making preparation of the liquid electrolyte difficult.

Concrete examples of the second substituent are: methyl group, ethyl group, n-propyl group, i-propyl group, n-butyl group, t-butyl group, n-pentyl group, 1-methylbutyl group, 2-methylbutyl group, 3-methylbutyl group, 1,2-dimethylpropyl group, 1-ethylproyl group, n-hexyl group, 1-methylpentyl group, 2-methylpentyl group, 3-methylpentyl group, 4-methylpentyl group, 1,2-dimethylbutyl group, 1,3-dimethylbutyl group, 2,3-dimethylbutyl group, 2-ethylbutyl group and 3-ethylbutyl group.

Of these, preferable are methyl group and ethyl group.

All or part of hydrogen atoms in the first substituent and/or second substituent of specific compound (I) may be substituted with a fluorine atom. Because a fluorine atom is highly resistant against oxidation, they are preferable as substituent element. There is no special limitation on the number of substituted fluorine atoms in specific compound (I). Preferably, it is 6 or less.

The molecular weight of the specific compound (I) is usually 132 or higher and usually 188 or lower, preferably 160 or lower. If this upper limit is exceeded, dissolution of the solute tends to be difficult.

Concrete examples of specific compound (I) are: di-n-propyl carbonate, diisopropyl carbonate, n-propylisopropyl carbonate, di-n-butyl carbonate, di-i-propyl carbonate, di-t-butyl carbonate, n-butyl-i-butyl carbonate, n-butyl-t-butyl carbonate, i-butyl-t-butyl carbonate, n-butylmethyl carbonate, i-butylmethyl carbonate, t-butylmethyl carbonate, ethyl-n-propyl carbonate, n-butylethyl carbonate, i-butylethyl carbonate, t-butylethyl carbonate, n-butyl-n-propyl carbonate, i-butyl-n-propyl carbonate, t-butyl-n-propyl carbonate, n-butyl-i-propyl carbonate, i-butyl-i-propyl carbonate and t-butyl-i-propyl carbonate.

Concrete examples of specific compound (I) of the linear carbonate structure in which one or more hydrogen atoms are replaced by one or more fluorine atoms are: 4-monofluorobutylmethyl carbonate, 4,4-difluorobutylmethyl carbonate, 4,4,4-trifluorobutyl carbonate, methyl-3,3,4,4,4-pentafluorobutyl carbonate, 2,2,3,3,4,4,4-heptafluorobutylmethyl carbonate, ethyl-3-monofluoropropyl carbonate, 3,3-difluoropropylethyl carbonate, ethyl-3,3,3-trifluoropropyl carbonate, ethyl-2,2,3,3,3-pentafluoro carbonate, 2-monofluoroethylpropyl carbonate, 2,2-difluoroethylpropyl carbonate, propyl-2,2,2-trifluoroethyl carbonate, 2,2,2-trifluoroethyl-3,3,3-trifluoropropyl carbonate, 3,3,3,2,2-pentafluoropropyl-2,2,2-trifluoroethyl carbonate, 3-monofluoropropylpropyl carbonate, 3,3-difluoropropylpropyl carbonate, propyl-3,3,3-trifluoropropyl carbonate, 3,3,3,2,2-pentafluoropropylpropyl carbonate, bis-2-monofluoropropyl carbonate, bis-2,2-difluoropropyl carbonate, bis-2,2,2-trifluoropropyl carbonate and bis-3,3,3,2,2-pentafluoropropyl carbonate.

In the general formula (I) above, it is preferable that the compound is an asymmetric carbonate with n and m being different integers. Of those compounds, preferable are methylbutyl carbonate, ethylpropyl carbonate and ethylbutyl carbonate from the standpoint of basic characteristics as liquid electrolyte such as viscosity and conductivity. Furthermore, from the standpoint of battery characteristics such as cycle characteristics, preferable are methylbutyl carbonate, ethylpropyl carbonate, ethylbutyl carbonate and dipropyl carbonate. Of these compounds, particularly preferable are ethylpropyl carbonate, ethylbutyl carbonate and dipropyl carbonate.

Specific compound (I) can be used in the first non-aqueous liquid electrolyte (I) either singly or as a combination of more than one kind in any combination and in any ratio.

The proportion of specific compound (I) in the first non-aqueous liquid electrolyte (I) is usually 50 volume % or larger, preferably 60 volume % or larger, and usually 95 volume % or smaller, preferably 90 volume % or smaller. When the proportion of specific compound (I) is too small, dissociation degree of a lithium salt tends to be lower and electric conductivity of the non-aqueous liquid electrolyte obtained also tends to be lower. On the other hand, when the proportion of specific compound (I) is too large, the viscosity of the non-aqueous liquid electrolyte obtained tends to be high.

I-1-1b. Saturated Cyclic Carbonate:

Examples of saturated cyclic carbonates to be combined with the specific compound (I) above include ethylene carbonate, propylene carbonate and butylene carbonate. Any hydrogen atom in these cyclic carbonates may be substituted with fluorine atom.

Examples of compounds derived from the above cyclic carbonates by replacing one or more hydrogen atoms with one or more fluorine atoms are: fluoroethylene carbonate, chloroethylene carbonate, 4,4-difluoroethylene carbonate, 4,5-difluoroethylene carbonate, 4,4-dichloroethylene carbonate, 4,5-dichloroethylene carbonate,
4-fluoro-4-methylethylene carbonate,
4-chloro-4-methylethylene carbonate,
4,5-difluoro-4-methylethylene carbonate,
4,5-dichloro-4-methylethylene carbonate,
4-fluoro-5-methylethylene carbonate,
4-chloro-5-methylethylene carbonate,
4,4-difluoro-5-methylethylene carbonate,
4,4-dichloro-5-methylethylene carbonate,
4-(fluoromethyl)-ethylene carbonate,
4-(chloromethyl)-ethylene carbonate,
4-(difluoromethyl)-ethylene carbonate,
4-(dichloromethyl)ethylene carbonate,
4-(trifluoromethyl)-ethylene carbonate,
4-(trichloromethyl)-ethylene carbonate,
4-(trifluoromethyl)-4-fluoroethylene carbonate,
4-(chloromethyl)-4-chloroethylene carbonate,
4-(fluoromethyl)-5-fluoroethylene carbonate,
4-(chloromethyl)-5-chloroethylene carbonate,
4-fluoro-4,5-dimethylethylene carbonate,
4-chloro-4,5-dimethylethylene carbonate,
4,5-difluoro-4,5-dimethylethylene carbonate,
4,5-dichloro-4,5-dimethylethylene carbonate,
4,4-difluoro-5,5-dimethylethylene carbonate and
4,4-dichloro-5,5-dimethylethylene carbonate.

Of these, preferable are ethylene carbonate, propylene carbonate, fluoroethylene carbonate, 4,4-difluoroethylene carbonate, 4,5-difluoroethylene carbonate and 4-(fluoromethyl)-ethylene carbonate, because the solute can be dissolved easily due to their high dielectric constant and improved cycle characteristics of the battery can be expected.

These saturated cyclic carbonates can be used either singly or as a combination of more than one kind in any combination and in any ratio.

The proportion of the saturated cyclic carbonate in the non-aqueous liquid electrolyte (I) is usually 5 volume % or larger, preferably 10 volume % or larger, and usually 50 volume % or smaller, preferably 40 volume % or smaller. When the proportion of the saturated cyclic carbonate is too small, dissolution of the solute tends to be difficult. On the other hand, when the proportion is too large, the viscosity of the non-aqueous liquid electrolyte obtained tends to be high.

I-1-1c. Composition Ratio of Specific Compound (I) and Saturated Cyclic Carbonate The non-aqueous liquid electrolyte (I) contains the linear carbonate represented by the general formula (I)(specific compound (I)), saturated cyclic carbonate and specific carbonate described later. Of these compounds, specific carbonate is added to the non-aqueous liquid electrolyte (I) as an additive. Therefore, the composition ratio here refers to the ratio of specific compound (I) and saturated cyclic carbonate (hereafter, in the explanation of non-aqueous liquid electrolyte (I), these may sometimes be termed "non-aqueous solvent" collectively).

As preferable combination of the non-aqueous solvent in the non-aqueous liquid electrolyte (I) can be cited the following (a) and (b):
(a) Combination of the specific compound and the saturated cyclic carbonate.
(b) Combination of the specific carbonate, the saturated cyclic carbonate and other linear carbonate described later as desirable non-aqueous solvent.

As described previously, preferable content of specific compound (I) in the non-aqueous liquid electrolyte (I) is usually 50 volume % or higher, preferably 60 volume % or higher, and usually 95 volume % or lower, preferably 90 volume % or lower. Preferable content of the saturated cyclic carbonate in the non-aqueous liquid electrolyte (I) is usually 5 volume % or higher, preferably 10 volume % or higher, and usually 50 volume % or lower, preferably 40 volume % or lower. Even when other linear carbonate is also contained in the non-aqueous liquid electrolyte (I), volume ratio of specific compound (I) and the saturated cyclic carbonate is preferably 50:50 to 95:5, more preferably 60:40 to 90:10. When the ratio of the linear carbonate is too low, the viscosity of the non-aqueous liquid electrolyte obtained increases. When the ratio is too high, dissociation degree of a lithium salt decreases and electric conductivity of the non-aqueous liquid electrolyte obtained may become low.

The volume ratio of the other linear carbonate to the sum of specific carbonate (I) and the saturated cyclic carbonate is usually 30 volume % or lower, preferably 25 volume % or lower. Inclusion of the other linear carbonate in the non-aqueous liquid electrolyte (I) is helpful in making a solute easily soluble even when the solute is difficult to dissolve with specific carbonate (I) and the saturated cyclic carbonate alone. However, when the ratio exceeds this above limit, cycle characteristics may deteriorate.

In the non-aqueous liquid electrolyte (I), particularly preferable combination and its volume ratio of non-aqueous solvents, although these are not intended to be exhaustive, are as described below.
(1) Ethylene carbonate (EC) and ethyl-n-propyl carbonate (EPC)
EC:EPC=10:90 to 40:60, more preferably 20:80 to 30:70
(2) EC and dipropyl carbonate (DPC)
EC:DPC=10:90 to 40:60, more preferably 20:80 to 30:70
(3) EC and ethyl-n-butyl carbonate (EBC)
EC:EBC=10:90 to 40:60, more preferably 20:80 to 30:70
(4) Fluoroethylene carbonate (FEC) and EC and ethyl-n-propyl carbonate (EPC)
FEC:EC:EPC=5:5:90 to 25:25:50, more preferably 10:10:80 to 20:20:60
(5) FEC and EPC
FEC:EPC=10:90 to 40:60, more preferably 20:80 to 30:70
(6) FEC and DPC
FEC:DPC=10:90 to 40:60, more preferably 20:80 to 30:70
(7) FEC and EBC
FEC:EBC=10:90 to 40:60, more preferably 20:80 to 30:70

In the combinations of (1) to (7) above, still another linear carbonate may be added such as dimethyl carbonate (DMC), ethylmethylmethyl carbonate (EMC) and diethylcarbonate (DEC). Examples include the following combination and volume ratio.
(8) EC and EPC and DEC
EC:EPC:DEC=10 to 40:40 to 80:10 to 30
(9) EC and DPC and DEC
EC:DPC:DEC=10 to 40:40 to 80:10 to 30

(10) FEC and EPC and DEC

FEC:EPC:DEC=10 to 40:40 to 80:10 to 30

(11) FEC and DPC and DEC

FEC:DPC:DEC=10 to 40:40 to 80:10 to 30

In the above examples of preferable combination, any hydrogen atom of the alkyl groups of EPC, DPC and EBC may be replaced by a fluorine atom.

In addition to the above combination, it is preferable that the specific carbonate to be described later is added to the non-aqueous liquid electrolyte (I) in the amount of usually 0.01 weight % or larger, preferably 0.1 weight % or larger, more preferably 0.3 weight % or larger, and usually 50 weight % or smaller, preferably 40 weight % or smaller, more preferably 30 weight % or smaller. The rationale of this range will be mentioned later.

I-1-1d. Others:

The charge-discharge cycle characteristics are improved in the non-aqueous liquid electrolyte (I) containing the above-mentioned specific linear carbonate (specific compound (I)), saturated cyclic carbonate and specific carbonate described later. The detailed reason is not clear, but inferred as follows.

The reactivity of the specific compound (I) in the non-aqueous liquid electrolyte (I) towards anode electrode active material containing metal element mentioned above becomes low by the presence of alkyl group or fluoroalkyl group with 3 or more carbon atoms, leading to suppression of a side reaction and inhibition of deterioration of cycle characteristics. The similar effect can be obtained when the total number of carbon atoms of alkyl or fluoroalkyl groups of the linear carbonate is 5 or more. Thus, under the condition where the side reaction due to the linear carbonate is suppressed, an effective protective layer is formed by the specific carbonate described later. Solubility of the electrolyte is enhanced by the saturated cyclic carbonate and improvement in charge-discharge cycle characteristics follows.

This advantageous effect of the present invention derived from the combined use of the specific compound (I), saturated cyclic carbonate and specific carbonate described later is characteristic of the use of anode electrode active material having at least one kind of atom selected from the group consisting of Si atom, Sn atom and Pb atom. As will be described later in [Example Comparative Example I], improvement in long term charge-discharge cycle characteristics can not be realized when carbon material is used as anode electrode active material.

<I-1-2. Component (ii)>

Component (ii) is a compound represented by the general formula (II) below (hereafter referred to as "specific compound (II)" as appropriate).

[Chemical Formula 16]

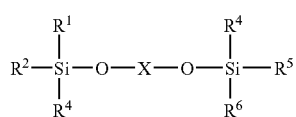

(In the above formula (II), X represents a group represented by

[Chemical Formula 17]

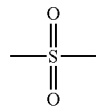

(This may be hereinafter described as "—$SO_2$-".)

or

[Chemical Formula 18]

(This may be hereinafter described as "—SO—".), and $R^1$ to $R^6$ each represent, independently of each other, an unsubstituted alkyl group or halogen-substituted alkyl group.)

In the general formula (II) above, X represents —$SO_2$— or —SO— above. When it represents —$SO_2$—, the compound is a sulfate ester, assuming a sulfate structure. When it represents —SO—, the compound is a sulfite ester, assuming a sulfite structure.

In the general formula (II) above, $R^1$ to $R^6$ each represent, independently of each other, an unsubstituted alkyl group or halogen-substituted alkyl group. The number of carbon atoms of this alkyl group is usually one or more and 6 or less, preferably 3 or less. If n is too large, the effect of specific compound (II) per unit weight is not significant, making the presence of the compound meaningless.

Concrete examples of alkyl group are: methyl group, ethyl group, n-propyl group, i-propyl group, n-butyl group, s-butyl group, i-butyl group, t-butyl group, n-pentyl group, 1-methylbutyl group, 2-methylbutyl group, 3-methylbutyl group, 1,2-dimethylpropyl group, 1-ethylpropyl group, n-hexyl group, 1-methylpentyl group, 2-methylpentyl group, 3-methylpentyl group, 4-methylpentyl group, 1,2-dimethylbutyl group, 1,3-dimethylbutyl group, 2,3-dimethylbutyl group, 2-ethylbutyl group and 3-ethylbutyl group.

Of these, preferable are methyl group, ethyl group and n-propyl group.

When $R^1$ to $R^6$ are halogen-substituted alkyl groups, substitution may be for all the hydrogen atoms of the alkyl group or for part of the hydrogen atoms. Fluorine atom and chlorine atom are cited as halogen atom. Fluorine atom is preferable because of its high resistance against oxidation. No particular limitation is imposed on the number of substituted halogen atoms. Preferable is 6 or less, more preferable is 3 or less, per one alkyl group.

Examples of halogen-substituted alkyl group, where halogen atom is fluorine atom, are: fluoromethyl group, 1-fluoroethyl group, 2-fluoroethyl group, 1-fluoro-n-propyl group, 2-fluoro-n-propyl group, 3-fluoro-n-propyl group, difluoromethyl group, 1,1-difluoroethyl group, 1,2-difluoroethyl group, 2,2-difluoroethyl group, 1,1-difluoro-n-propyl group, 1,2-difluoro-n-propyl group, 1,3-difluoro-n-propyl group, 2,2-difluoro-n-propyl group, 2,3-difluoro-n-propyl group, 3,3-difluoro-n-propyl group, trifluoromethyl group, 1,1,2-trifluoroethyl group, 1,2,2-trifluoroethyl group, 2,2,2-trifluoroethyl group, 1,1,2-trifluoro-n-propyl group, 1,2,2-trifluoro-n-proppyl group, 1,1,3-trifluoro-n-propyl group, 1,2,3-trifluoro-n-propyl group, 1,3,3-trifluoro-n-propyl group, 2,2, 3-trifluoro-n-propyl group, 2,3,3-trifluoro-n-propyl group and 3,3,3-trifluoro-n-propyl group.

The groups derived from the above-mentioned groups by substituting any fluorine atom with any other halogen atom can also be cited as halogen-substituted alkyl groups.

Of these groups, preferable from the standpoint of stability and ease of preparation are fluoromethyl group, trifluoromethyl group, 2-fluoroethyl group, 2,2-difluoroethyl group, 2,2,2-trifluoroethyl group, 3-fluoro-n-propyl group and 3,3,3-trifluoro-n-propyl group.

In the general formula (II) above, $R^1$ to $R^6$ may be either the same or different from one another. From the standpoint of ease of preparation, it is preferable that they belong to the same group.

Accordingly, as concrete examples of specific compound (II) can be cited: silicon-containing sulfate esters such as bis(trimethylsilyl)sulfate,
bis{tris(fluoromethyl)silyl}sufate,
bis(triethylsilyl)sulfate, bis{tris(2-fluoroethyl)}sulfate,
bis{tris(2,2-difluoroethyl)}sulfate,
bis{tris(2,2,2-trifluoroethyl)}sulfate,
bis(tri-n-propyl)sulfate,
bis{tris(3-fluoro-n-propyl)}sulfate and
bis{tris(3,3,3-trifluoro-n-propyl)}sulfate; and
silicon-containing sulfite esters such as
bis(trimethylsilyl)sulfite,
bis{tris(fluoromethyl)silyl}sulfite,
bis(triethylsilyl)sulfite, bis{tris(2-fluoroethly)}sulfite,
bis{tris(2,2-difluoroethyl)}sulfite,
bis{tris(2,2,2-trifluoroethyl)}sulfite,
bis(tri-n-propyl)sulfite,
bis{tris(3-fluoro-n-propyl)}sulfite and
bis{tris(3,3,3-trifluoro-n-propyl)}sulfite.

Of these compounds, preferable are those in which $R^1$ to $R^6$ in the general formula (II) are, independently of each other, an unsubstituted or fluorine-substituted alkyl group with 1 to 3 carbon atoms. Concrete examples are: bis(trimethylsilyl)sulfate, bis(triethylsilyl)sulfate,
bis{tris(2-fluoroethyl)}sulfate,
bis{tris(2,2,2-trifluoroethyl)}sulfate,
bis(tri-n-propyl)sulfate, bis(trimethylsilyl)sulfite,
bis(triethylsilyl)sulfite, bis{tris(2-fluoroethly)}sulfite,
bis{tris(2,2,2-trifluoroethyl)}sulfite and
bis(tri-n-propyl)sulfite.

For these compounds, it is preferable that $R^1$ to $R^6$ are the same group. Furthermore, it is particularly preferable that, in the above formula (II), $R^1$ to $R^6$ are the same group and they are an unsubstituted or fluorine-substituted alkyl group with 1 or 2 carbon atoms. From the standpoint of ease of technical availability, unsubstituted alkyl groups with 1 to 2 carbon atoms are particularly preferable.

There is no special limitation on the molecular weight of specific compound (II), insofar as the advantage of the present invention is not significantly impaired. It is usually 100 or larger, preferably 110 or larger. No upper limit is imposed, although from a practical standpoint it is usually 400 or smaller, preferably 300 or smaller, as the viscosity increases with the molecular weight.

There is no special limitation on the method of producing specific compound (II) and any known method can be selected and used.

Specific compound (II), explained above, may be used in the non-aqueous liquid electrolyte (II) either singly or as a mixture of more than one kind in any combination and in any ratio.

There is no special limitation on the proportion of specific compound (II) in the non-aqueous liquid electrolyte (II), inso-far as the advantage of the present invention is not significantly impaired. The proportion is usually 0.01 weight % or larger, preferably 0.1 weight % or larger, and usually 10 weight % or smaller, preferably 5 weight % or smaller. If the proportion of specific compound (II) is too small, adequate effect of improving the cycle characteristics of the secondary battery are not guaranteed when the non-aqueous liquid electrolyte is used for the non-aqueous liquid electrolyte secondary battery. On the other hand, if the proportion of specific compound (II) is too large, chemical reactivity of the non-aqueous liquid electrolyte tends to increase and battery characteristics of the non-aqueous liquid electrolyte secondary battery obtained may deteriorate.

In the non-aqueous liquid electrolyte (II), there is no special limitation on the ratio of the specific compound (II) and specific carbonate described later. Relative weight ratio expressed as "weight of specific compound (II)/weight of specific carbonate" is usually 0.0001 or larger, preferably 0.001 or larger, more preferably 0.01 or larger, and usually 1000 or smaller, preferably 100 or smaller, more preferably 10 or smaller. If the above relative weight ratio is either too large or too small, synergistic effect of the specific compound (II) and specific carbonate may not be realized.

It is possible to improve the charge-discharge cycle characteristics of the non-aqueous liquid electrolyte secondary battery by using the non-aqueous liquid electrolyte (II) containing the above-mentioned specific compound (II) and the specific carbonate described later. The detailed reason is not clear, but inferred as follows. Namely, through the reaction of both specific compound (II) and specific carbonate contained in the non-aqueous liquid electrolyte (II), an effective protective layer is formed on the surface of the anode electrode active material, leading to the suppression of side reactions. Cycle deterioration is thus inhibited. Although detailed reason is not clear, coexistence of the specific compound (II) and the specific carbonate in the liquid electrolyte contributes to the improvement of the characteristics of the protective layer in some way or other.

This advantageous effect of the present invention derived from the combined use of the specific compound (II) and the specific carbonate described later is characteristic of the use of anode electrode active material having at least one kind of atom selected from the group consisting of Si atom, Sn atom and Pb atom. As will be described later in [Example•Comparative Example II], improvement in long term charge-discharge cycle characteristics can not be realized when carbon material is used as anode electrode active material.

<I-1-3. Component (iii)>

Component (iii) is a compound represented by the general formula (III-1) below (hereinafter abbreviated as "specific compound (III)", as appropriate).

[Chemical Formula 19]

$$A-N=C=O \qquad (\text{III-1})$$

In the formula (III-1) above, A represents an arbitrary element or group other than hydrogen. From the standpoint of electrochemical stability, it is preferable that A is a group other than aryl group or other than group having aryl group as substituent. Namely, it is preferable that A is an element or group other than aryl group and it is also preferable that A is an element or group other than group having aryl group as substituent.

Furthermore, from the standpoint of stability of specific compound (III) as organic material and stability of protective layer formed, A is preferably halogen among various elements. Of various functional groups, A is preferably a chained or cyclic, saturated or unsaturated alkyl group which may have a substituent.

Of specific compounds (III), preferable are those represented by the general formula (III-2) or (III-3) below.

[Chemical Formula 20]

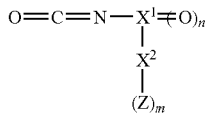

(III-2)

(In the above formula (III-2), $X^1$ and $X^2$ represent, independently of each other, an element other than hydrogen and Z represents an arbitrary element or group. M and n represent, independently of each other, an integer greater than or equal to 1. When m is 2 or greater, each of Z may be the same or different from each other.)

[Chemical Formula 21]

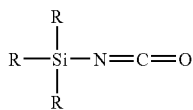

(III-3)

(In the above formula (III-3), R represents, independently of each other, an alkyl group or aryl group that may have a substituent. In addition, more than one R may be connected to each other to form a ring.)

The formula (III-2) and (III-3) will be explained in further detail below.

In the formula (III-2), $X^1$ and $X^2$ represent, independently of each other, an element other than hydrogen. Any element other than hydrogen can be $X^1$ and $X^2$, in so far as they are consistent with the chemical structure of (III-2). As concrete examples of preferable $X^1$ can be cited carbon atom, sulfur atom and phosphor atom. As concrete examples of preferable $X^2$ can be cited oxygen atom and nitrogen atom.

In the formula (III-2), Z represents an arbitrary element or group. Preferable concrete examples of Z include an alkyl group. Of the alkyl group, preferable are methyl group, ethyl group, fluoromethyl group, trifluoromethyl group, 2-fluoroethyl group and 2,2,2-trifluoroethyl group. Particularly preferable are methyl group and ethyl group. When m is greater than or equal to 2, each of Z may be the same or different from each other. Further, more than one Z may be connected to each other to form a ring.

In the formula (III-2), m and n indicate an integer which is greater than or equal to 1. As concrete examples of preferable specific compounds expressed in the formula (III-2) can be cited the following compounds. In the compounds shown below, each of $R^1$ represents, independently of each other, an alkyl group. As concrete examples of $R^1$, alkyl groups described as appropriate examples of Z in the formula (III-2) can be cited.

[Chemical Formula 22]

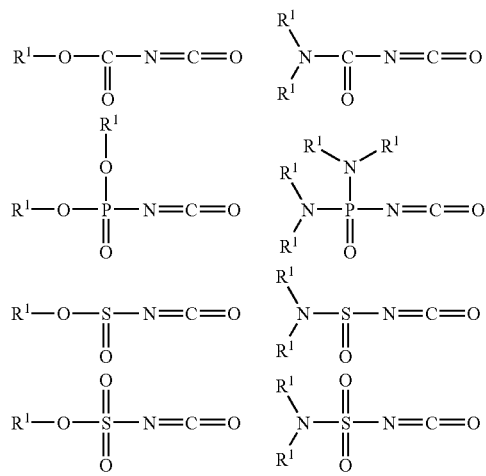

On the other hand, in the formula (III-3), R represents, independently of each other, an alkyl group or aryl group that may have a substituent.

When R is an alkyl group, concrete examples of R include methyl group, ethyl group, fluoromethyl group, trifluoromethyl group, 2-fluoroethyl group and 2,2,2-trifluoroethyl group. Preferable are methyl group and ethyl group.

In case R is an aryl group, concrete examples include phenyl group, o-tosyl group, m-tosyl group, p-tosyl group, o-fluorophenyl group, m-fluorophenyl group and p-fluorophenyl group.

Each R may be identical to or different from each other. More than one R may be connected with each other to form a ring.

Concrete examples of specific compound (III) include the following:

[Chemical Formula 23]

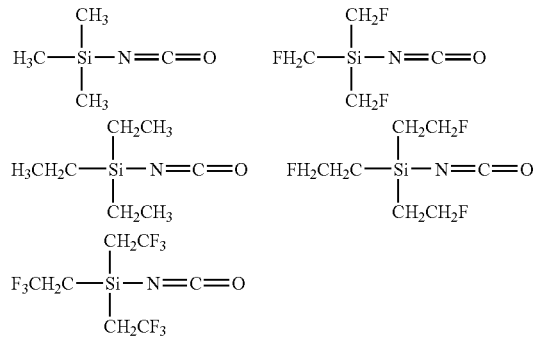

[Chemical Formula 24]

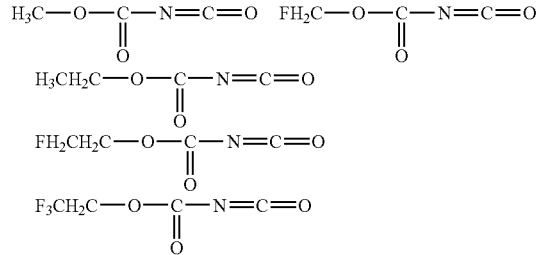

-continued

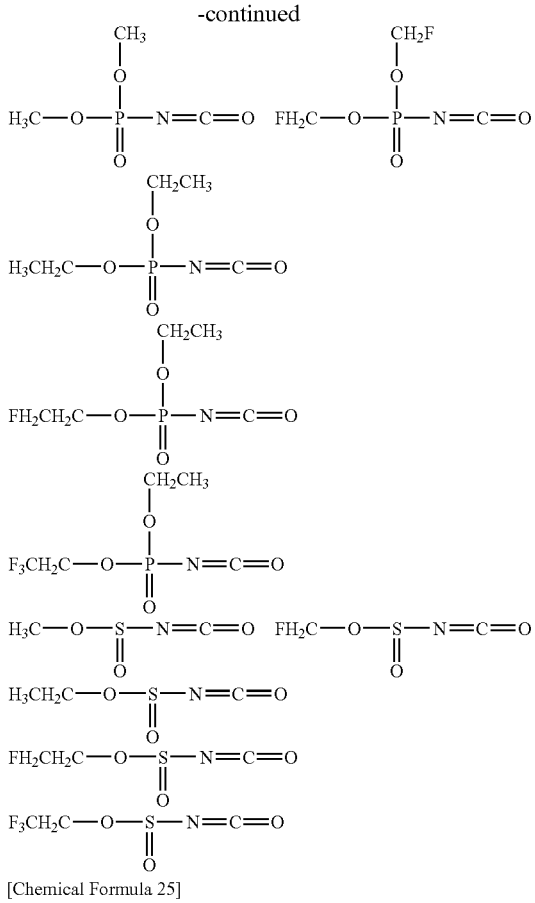

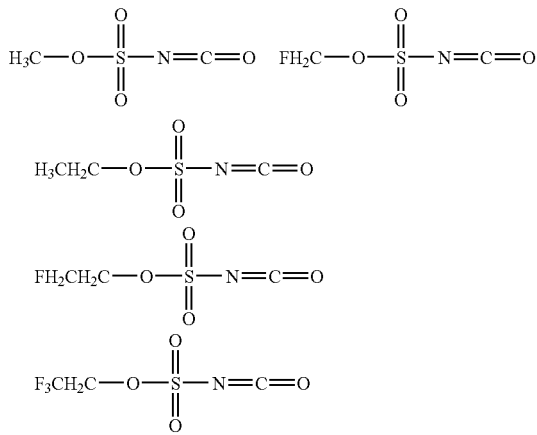

Specific compound (III) may be used in the non-aqueous liquid electrolyte (III) either singly or as a mixture of more than one kind in any combination and in any ratio.

There is no special limitation on the molecular weight of specific compound (III), insofar as the advantage of the present invention is not significantly impaired. It is usually 100 or larger. Although no upper limit is imposed, it is usually 300 or smaller, preferably 200 or smaller from a practical standpoint.

There is no special limitation on the proportion of the specific compound (III) in the non-aqueous liquid electrolyte (III), insofar as the advantage of the present invention is not significantly impaired. Usually, the proportion is 0.01 weight % or larger, preferably 0.1 weight % or larger, and usually 10 weight % or smaller, preferably 5 weight % or smaller in the non-aqueous liquid electrolyte (III). In case the proportion is below the above-mentioned lower limit, adequate effect of improving cycle characteristics of the non-aqueous liquid electrolyte secondary battery obtained is not guaranteed when the non-aqueous liquid electrolyte is used for the non-aqueous liquid electrolyte secondary battery. In case the upper limit is exceeded, chemical reactivity of the non-aqueous liquid electrolyte tends to increase and battery characteristics of the non-aqueous liquid electrolyte secondary battery obtained may deteriorate.

There is no special limitation on the method of producing specific compound (III) and any known method can be used.

In the non-aqueous liquid electrolyte (III), there is no special limitation on the ratio of specific compound (III) and the specific carbonate described later. Relative weight ratio expressed as "weight of specific compound (III)/weight of specific carbonate" is usually 0.001 or larger, preferably 0.01 or larger, more preferably 0.1 or larger, and usually 1000 or smaller, preferably 100 or smaller, more preferably 10 or smaller. If the above relative ratio is too large or too small, synergistic effect by combined use of specific compound (III) and the specific carbonate may not be realized.

It is possible to improve the charge-discharge cycle characteristics of the non-aqueous liquid electrolyte secondary battery by using the non-aqueous liquid electrolyte (III) containing the above-mentioned specific compound (III) and the specific carbonate described later. The detailed reason is not clear, but inferred as follows. Namely, through the reaction of both specific compound (III) and the specific carbonate contained in the non-aqueous liquid electrolyte (III), an effective protective layer is formed on the surface of the anode electrode active material, leading to the suppression of side reactions. Cycle deterioration is thus inhibited.

[I-2. Specific Carbonate]

The specific carbonate of the present invention indicates a carbonate having at least either an unsaturated bond or a halogen atom. Namely, specific carbonate of the present invention may contain only an unsaturated bond or only a halogen atom. It may also contain both an unsaturated bond and a halogen atom.

There is no special limitation on the kind of carbonate having an unsaturated bond (referred to "unsaturated carbonate" as appropriate), insofar as it is a carbonate having carbon-to-carbon unsaturated bond such as carbon-to-carbon double bond or carbon-to-carbon triple bond. Any known unsaturated carbonate can be used. A carbonate having an aromatic ring can also be regarded as carbonate having an unsaturated bond.

As examples of the unsaturated carbonate can be cited vinylene carbonate and its derivatives, ethylene carbonate substituted by a substituent having an aromatic ring or carbon-to-carbon unsaturated bond and its derivatives, phenyl carbonates, vinyl carbonates and allyl carbonates.

Concrete examples of vinylene carbonate and its derivatives are: vinylene carbonate, methylvinylene carbonate, 4,5-dimethylvinylene carbonate, phenylvinylene carbonate and 4,5-diphenylvinylene carbonate.

Concrete examples of ethylene carbonate substituted by a substituent containing an aromatic ring or a carbon-to-carbon unsaturated bond and its derivatives are: vinylethylene carbonate, 4,5-divinylethylene carbonate, phenylethylene carbonate and 4,5-diphenylethylene carbonate.

Concrete examples of phenyl carbonates are: diphenyl carbonate, ethylphenyl carbonate, methylphenyl carbonate and t-butylphenyl carbonate.

Concrete examples of vinyl carbonates are: divinyl carbonate and methylvinyl carbonate.

Concrete examples of allyl carbonates are: diallyl carbonate and allylmethyl carbonate.

Of these unsaturated carbonate compounds, preferable as specific carbonate are vinylene carbonate and its derivatives, and ethylene carbonate substituted by a substituent having an aromatic ring or carbon-to-carbon unsaturated bond and its derivatives. In particular, vinylene carbonate, 4,5-diphenylvinylene carbonate, 4,5-dimethylvinylene carbonate and vinylethylene carbonate can be preferably used, as they form a stable interface protective layer.

On the other hand, regarding a carbonate having a halogen atom (abbreviated as "halogenated carbonate" as appropriate), no special limitation exists on its kind insofar as it contains a halogen atom. Any halogenated carbonate can be used.

Concrete examples of halogen atoms are fluorine atom, chlorine atom, bromine atom and iodine atom. Of these, preferable are fluorine atom and chlorine atom. Fluorine atom is particularly preferable. There is no special limitation on the number of halogen atoms contained in the halogenated carbonate insofar as it is one or more, and usually 6 or less, preferably 4 or less. When the halogenated carbonate contains more than one halogen atoms, they can be identical to or different from each other.

Examples of halogenated carbonate include ethylene carbonate derivatives, dimethyl carbonate derivatives, ethylmethyl carbonate derivatives and diethyl carbonate derivatives.

Concrete examples of ethylene carbonate derivatives are: fluoroethylene carbonate, chloroethylene carbonate, 4,4-difluoroethylene carbonate, 4,5-difluoroethylene carbonate, 4,4-dichloroethylene carbonate, 4,5-dichloroethylene carbonate, 4-fluoro-4-methylethylene carbonate, 4-chloro-4-methylethylene carbonate,
4,5-difluoro-4-methylethylene carbonate,
4,5-dichloro-4-methylethylene carbonate,
4-fluoro-5-methylethylene carbonate,
4-chloro-5-methylethylene carbonate,
4,4-difluoro-5-methylethylene carbonate,
4,4-dichloro-5-methylethylene carbonate,
4-(fluoromethyl)-ethylene carbonate,
4-(chloromethyl)-ethylene carbonate,
4-(difluoromethyl)-ethylene carbonate,
b 4-(dichloromethyl)-ethylene carbonate,
4-(trifluoromethyl)-ethylene carbonate,
4-(trichloromethyl)-ethylene carbonate,
4-(fluoromethyl)-4-fluoroethylene carbonate,
4-(chloromethyl)-4-chloroethylene carbonate,
4-(fluoromethyl)-5-fluoroethylene carbonate,
4-(chloromethyl)-5-chloroethylene carbonate,
4-fluoro-4,5-dimethylethylene carbonate,
4-chloro-4,5-dimethylethylene carbonate,
4,5-difluoro-4,5-dimethylethylene carbonate,
4,5-dichloro-4,5-dimethylethylene carbonate,
4,4-difluoro-5,5-dimethylethylene carbonate and
4,4-dichloro-5,5-dimethylethylene carbonate.

Concrete examples of dimethyl carbonate derivatives are: fluoromethyl methyl carbonate, difluoromethyl methyl carbonate, trifluoromethylmethyl carbonate, bis(fluoromethyl) carbonate, bis(difluoro)methyl carbonate, bis(trifluoro)methyl carbonate, chloromethylmethyl carbonate, dichloromethylmethyl carbonate, trichloromethylmethyl carbonate, bis(chloromethyl)carbonate, bis(dichloro)methyl carbonate and bis(trichloro)methyl carbonate.

Concrete examples of ethylmethyl carbonate derivatives are: 2-fluoroethylmethyl carbonate, ethylfluoromethyl carbonate, 2,2-difluoroethylmethyl carbonate, 2-fluoroethylfluoromethyl carbonate, ethyldifluoromethyl carbonate, 2,2,2-trifluoroethylmethyl carbonate, 2,2-difluoroethylfluoromethyl carbonate, 2-fluoroethyldifluoromethyl carbonate, ethyltrifluoromethyl carbonate, 2-chloroethylmethyl carbonate, ethylchloromethyl carbonate, 2,2-dichloroethylmethyl carbonate, 2-chloroethylchloromethyl carbonate, ethyldichloromethyl carbonate, 2,2,2-trichloroethylmethyl carbonate, 2,2-dichloroethylchloromethyl carbonate, 2-chloroethyldichloromethyl carbonate and ethyltrichloromethyl carbonate.

Concrete examples of diethyl carbonate derivatives are: ethyl-(2-fluoroethyl) carbonate, ethyl-(2,2-difluoroethyl) carbonate, bis(2-fluoroethyl) carbonate,
ethyl-(2,2,2-trifluoroethyl) carbonate,
2,2-difluoroethyl-2'-fluoroethyl carbonate,
bis(2,2-difluoroethyl) carbonate,
2,2,2-trifluoroethyl-2'-fluoroethyl carbonate,
2,2,2-trifluoroethyl-2',2'-difluoroethyl carbonate,
bis(2,2,2-trifluoroethyl) carbonate, ethyl-(2-chloroethyl) carbonate, ethyl-(2,2-dichloroethyl) carbonate,
bis(2-chloroethyl) carbonate, ethyl-(2,2,2-trichloroethyl) carbonate, 2,2-dichloroethyl-2'-chloroethyl carbonate,
bis(2,2-dichloroethyl) carbonate,
2,2,2-trichloroethyl-2'-chloroethyl carbonate,
2,2,2-trichloroethyl-2',2'-dichloroethyl carbonate and bis(2,2,2-trichloroethyl) carbonate.

Of these halogenated carbonates, preferable are carbonates containing a fluorine atom. Particularly preferable are ethylene carbonate derivatives containing a fluorine atom. In particular, fluoroethylene carbonate, 4-(fluoromethyl)-ethylene carbonate, 4,4-difluoroethylene carbonate and 4,5-difluoroethylene carbonate can preferably be used, as these compounds form an interface protective layer.

Furthermore, it is possible to use a carbonate containing both an unsaturated bond and a halogen atom (abbreviated as "halogenated unsaturated carbonate" as appropriate) as specific carbonate. There is no special limitation on the halogenated unsaturated carbonate used and any such compounds can be used insofar as the advantage of the present invention is not significantly impaired.

Examples of halogenated, unsaturated carbonates include vinylene carbonate derivatives, ethylene carbonate derivatives substituted by a substituent having an aromatic ring or carbon-to-carbon unsaturated bond, and allyl carbonates.

Concrete examples of vinylene carbonate derivatives are: fluorovinylene carbonate, 4-fluoro-5-methylvinylene carbonate, 4-fluoro-5-phenylvinylene carbonate, chlorovinylene carbonate, 4-chloro-5-methylvinylene carbonate and 4-chloro-5-phenylvinylene carbonate.

Concrete examples of ethylene carbonate derivatives which is substituted by a substituent having an aromatic ring or carbon to carbon unsaturated bond are: 4-fluoro-4-vinylethylene carbonate, 4-fluoro-5-vinylethylene carbonate,
4,4-difluoro-4-vinylethylene carbonate,
4,5-difluoro-4-vinylethylene carbonate,
4-chloro-5-vinylethylene carbonate,
4,4-dichloro-4-vinylethylene carbonate,
4,5-dichloro-4-vinylethylene carbonate,
4-fluoro-4,5-divinylethylene carbonate,
4,5-difluoro-4,5-divinylethylene carbonate,
4-chloro-4,5-divinylethylene carbonate,
4,5-dichloro-4,5-divinylethylene carbonate,
4-fluoro-4-phenylethylene carbonate,
4-fluoro-5-phenylethylene carbonate,
4,4-difluoro-5-phenylethylene carbonate,
4,5-difluoro-4-phenylethylene carbonate, 4-chloro-4-phenylethylene carbonate,
4-chloro-5-phenylethylene carbonate,
4,4-dichloro-5-phenylethylene carbonate,
4,5-dichloro-4-phenylethylene carbonate,
4,5-difluoro-4,5-diphenylethylene carbonate and
4,5-dichloro-4,5-diphenylethylene carbonate.

Concrete examples of phenyl carbonates are: fluoromethylphenyl carbonate, 2-fluoroethylphenyl carbonate, 2,2-difluoroethylphenyl carbonate, 2,2,2-trifluoroethylphenyl carbonate, chloromethylphenyl carbonate, 2-chloroethylphenyl carbonate, 2,2-dichloroethylphenyl carbonate and 2,2,2-trichloroethylphenyl carbonate.

Concrete examples of vinyl carbonates are: fluoromethylvinyl carbonate, 2-fluoroethylvinyl carbonate, 2,2-difluoroethylvinyl carbonate, 2,2,2-trifluoroethylvinyl carbonate, chloromethylvinyl carbonate, 2-chloroethylvinyl carbonate, 2,2-dichloroethylvinyl carbonate and 2,2,2-trichloroethylvinyl carbonate.

Concrete examples of allyl carbonates are: fluoromethylallyl carbonate, 2-fluoroethylallyl carbonate, 2,2-difluoroethylallyl carbonate, 2,2,2-trifluoroethylallyl carbonate, chloromethylallyl carbonate, 2-chloroethylallyl carbonate, 2,2-dichloroethylallyl carbonate and 2,2,2-trichloroethylallyl carbonate.

Of the halogenated unsaturated carbonates mentioned above, particularly preferable as specific carbonate are one or more compounds selected from the group consisting of vinylene carbonate, vinylethylene carbonate, fluoroethylene carbonate, 4,5-difluoroethylene carbonate, and derivatives of these carbonate compounds, which are highly effective when used alone.

There is no special limitation on the molecular weight of the specific carbonate, insofar as the advantage of the present invention is not significantly impaired. It is usually 50 or larger, preferably 80 or larger, and usually 250 or smaller, preferably 150 or smaller. When it is too large, the solubility of the specific carbonate in the non-aqueous liquid electrolyte decreases and the advantageous effect of the present invention may not be adequately realized.

There is no special limitation on the method of producing the specific carbonate and any known method can be selected and used.

The specific carbonate, explained above, may be used in the first non-aqueous liquid electrolyte of the present invention either singly or as a mixture of more than one kind in any combination and in any ratio.

There is no special limitation on the proportion of the specific carbonate in the first non-aqueous liquid electrolyte of the present invention, insofar as the advantage of the present invention is not significantly impaired. The proportion is usually 0.01 weight % or larger, preferably 0.1 weight % or larger, more preferably 0.3 weight % or larger, and usually 70 weight % or smaller, preferably 50 weight % or smaller, more preferably 40 weight % or smaller. If the proportion is below the above-mentioned lower limit, adequate effect of improving cycle characteristics of the non-aqueous liquid electrolyte secondary battery are not guaranteed when the first non-aqueous liquid electrolyte of the present invention is used for the non-aqueous liquid electrolyte secondary battery. If the upper limit is exceeded, high-temperature storage characteristics and trickle charging characteristics of the non-aqueous liquid electrolyte secondary battery tend to deteriorate, leading to increased gas evolution and deterioration of discharge capacity retention, when the first non-aqueous liquid electrolyte of the present invention is used for the non-aqueous liquid electrolyte secondary battery.

In the non-aqueous liquid electrolyte (I), specific compound (I) and/or the saturated cyclic carbonate, mentioned above, may be a carbonate having an unsaturated bond and/or a halogen atom. In those cases, that specific compound (I) and/or saturated cyclic carbonate can function also as the specific carbonate, and use of additional specific carbonate is not necessary.

[I-3. Non-aqueous Solvent]

As non-aqueous solvent contained in the first non-aqueous liquid electrolyte of the present invention, any such solvent can be used, insofar as the advantageous effect of the present invention is not significantly impaired. Non-aqueous solvent may be used either singly or as a combination of more than one kind in any combination and in any ratio.

Examples of usually used non-aqueous solvent include: cyclic carbonate, linear carbonate, chained and cyclic carboxylic acid ester, chained and cyclic ether, phosphor-containing organic solvent and sulfur-containing organic solvent.

There is no special limitation on the kind of the cyclic carbonate. Examples of those usually used, except the specific carbonates mentioned previously, include: ethylene carbonate, propylene carbonate and butylene carbonate.

Of these compounds, ethylene carbonate and propylene carbonate are preferable because they have high dielectric constant, which effects easy dissolution of the solute, and assures good cycle characteristics when used for the non-aqueous electrolyte solution secondary battery. Accordingly, it is preferable that the first non-aqueous liquid electrolyte of the present invention contains, as non-aqueous solvent, ethylene carbonate and/or propylene carbonate, in addition to the specific carbonate mentioned before.

There is no special limitation on the kind of the linear carbonate, either. Examples of those usually used, except the specific carbonates mentioned previously, include: dimethyl carbonate, ethylmethyl carbonate, diethyl carbonate, methyl-n-propyl carbonate, ethyl-n-propyl carbonate and di-n-propyl carbonate.

Therefore, it is preferable that the first non-aqueous liquid electrolyte of the present invention contains, as non-aqueous solvent, at least one carbonate selected from the group consisting of dimethyl carbonate, ethylmethyl carbonate, diethyl carbonate, methyl-n-propyl carbonate, ethyl-n-propyl carbonate and di-n-propyl carbonate, in addition to the specific carbonate mentioned before. Of these, diethyl carbonate, methyl-n-propyl carbonate and ethyl-n-propyl carbonate are preferable, and diethyl carbonate is particularly preferable because of its excellent cycle characteristics when used for the non-aqueous liquid electrolyte secondary battery.

There is no special limitation on the kind of the chained carboxylic acid ester. Examples of those usually used include: methyl acetate, ethyl acetate, n-propyl acetate, i-propyl acetate, n-butyl acetate, i-butyl acetate, t-butyl acetate, methyl propionate, ethyl propionate, n-propyl propionate, i-propyl propionate, n-butyl propionate, i-butyl propionate and t-butyl propionate.

Of these compounds, preferable are ethyl acetate, methyl propionate and ethyl propionate.

There is no special limitation on the kind of cyclic carboxylic acid ester. Examples of those usually used include: γ-butyrolactone, γ-valerolactone and δ-valerolactone.

Of these, γ-butyrolactone is preferable.

There is no special limitation on the kind of the chained ether. Examples of those usually used include: dimethoxymethane, dimethoxyethane, diethoxymethane, diethoxyethane, ethoxymethoxymethane and ethoxymethoxyethane.

Of these, dimethoxyethane and diethoxyethane are preferable.

There is no special limitation on the kind of the cyclic ether. Examples of those usually used include: tetrahydrofuran and 2-methyltetrahydrofuran.

There is no special limitation on the kind of the phosphor-containing organic solvent. Examples of those usually used include: phosphoric acid esters such as trimethyl phosphate, triethyl phosphate and triphenyl phosphate; phosphinic acid esters such as trimethyl phosphite, triethyl phosphite and triphenyl phosphite; and phosphine oxides such as trimethyl phosphine oxide, triethyl phosphine oxide and triphenyl phosphine oxide.

There is no special limitation on the kind of the sulfur-containing organic solvent. Examples of those usually used include: ethylene sulfite, 1,3-propane sultone, 1,4-butane sultone, methyl methane sulfonate, busulfan, sulfolane, sulforene, dimethyl sulfone, diphenyl sulfone, methyl phenyl sulfone, dibutyl disulfide, dicyclohexyl disulfide, tetramethyl thiuram monosulfide, N,N-dimethylmethane sulfonamide and N,N-diethylmethane sulfonamide.

Of these compounds, it is preferable to use ethylene carbonate and/or propylene carbonate, which belongs to cyclic carbonate. It is further preferable to combine the linear carbonate with these cyclic carbonates.

When the cyclic carbonate and linear carbonate are used in combination as non-aqueous solvent, preferable content of the linear carbonate in the non-aqueous solvent of the first non-aqueous liquid electrolyte of the present invention is usually 30 weight % or higher, preferably 50 eight % or higher, and usually 95 weight % or lower, preferably 90 eight % or lower. On the other hand, preferable content of the cyclic carbonate in the non-aqueous solvent of the first non-aqueous liquid electrolyte of the present invention is usually 5 weight % or higher, preferably 10 weight % or higher, and usually 50 weight % or lower, preferably 40 weight % or lower. When the content of the linear carbonate is too low, the viscosity of the first non-aqueous liquid electrolyte of the present invention may increase. When the content is too high, dissociation degree of electrolyte lithium salt becomes low, leading to a decrease in electric conductivity of the first non-aqueous liquid electrolyte of the present invention.

In the non-aqueous liquid electrolyte (I), the saturated cyclic carbonate functions as non-aqueous solvent. Therefore, other non-aqueous solvent may be added to the above specific compound (I) and saturated cyclic carbonate but this is not necessary. When other non-aqueous solvent is combined, the total amount of the saturated cyclic carbonate and other non-aqueous solvent should preferably fall within the range specified above for the non-aqueous solvent.

[I-4. Electrolyte]

There is no special limitation on the kind of electrolyte used for the first non-aqueous liquid electrolyte of the present invention. Any electrolyte known to be used as electrolyte of the intended non-aqueous liquid electrolyte secondary battery can be used. When the first non-aqueous liquid electrolyte of the present invention is used for the lithium secondary battery, a lithium salt is usually used as electrolyte.

Concrete examples of electrolytes include: inorganic lithium salts such as $LiClO_4$, $LiAsF_6$, $LiPF_6$, $Li_2CO_3$, and $LiBF_4$; fluorine-containing organic lithium salt such as $LiCF_3SO_3$, $LiN(CF_3SO_2)_2$, $LiN(C_2F_5SO_2)_2$, lithium 1,3-hexafluoropropane disulfonylimide, lithium 1,2-tetrafluoroethane disulfonylimide, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$ and $LiBF_2(C_2F_5SO_2)_2$; dicarboxylic acid-containing lithium salt complexes such as lithium bis(oxalato)borate, lithium tris(oxalato)phosphate and lithium difluorooxalatoborate; and sodium salts and potassium salts such as $KPF_6$, $NaPF_6$, $NaBF_4$ and $NaCF_3SO_3$.

Of these, preferable are $LiPF_6$, $LiBF_4$, $LiCF_3SO_3$, $LiN(CF_3SO_2)_2$, $LiN(C_2F_5SO_2)_2$ and lithium 1,2-tetrafluoroethane disulfonylimide. Particularly preferable are $LiPF_6$ and $LiBF_4$.

The electrolyte can be used either singly or as a mixture of more than one kind in any combination and in any ratio. In particular, when two specific inorganic lithium salts are combined, or inorganic lithium salt and fluorine-containing organic lithium salt are combined, gas evolution at the time of trickle charging is suppressed or deterioration at the time of high temperature storage is suppressed, which is desirable. Particularly preferable are the combination of $LiPF_6$ and $LiBF_4$, or the combination of inorganic lithium salt, such as $LiPF_6$ and/or $LiBF_4$, and fluorine-containing organic lithium salt, such as $LiCF_3SO_3$, $LiN(CF_3SO_2)_2$ and $LiN(C_2F_5SO_2)_2$.

When $LiPF_6$ and $LiBF_4$ are combined, it is preferable that the ratio of $LiBF_4$ in the whole electrolyte is usually 0.01 weight % or higher and 20 weight % or lower. Dissociation of $LiBF_4$ is not extensive and if the ratio is too high, resistance of the liquid electrolyte may become high.

When inorganic lithium salt such as $LiPF_6$ and $LiBF_4$ and fluorine-containing organic lithium salt such as $LiCF_3SO_3$, $LiN(CF_3SO_2)_2$ and $LiN(C_2F_5SO_2)_2$ are used in combination, it is preferable that the ratio of inorganic lithium salt in the whole electrolyte is usually 70 weight % or higher, and 99 weight % or lower. The molecular weight of fluorine-containing organic lithium salt is generally higher than that of inorganic lithium salt. Therefore, when that ratio is too high, the ratio of solvent in the liquid electrolyte decreases, resulting in high resistance of the liquid electrolyte.

No particular limitation is imposed on the concentration of the lithium salt in the first non-aqueous liquid electrolyte of the present invention, insofar as the advantage of the present invention is not significantly impaired. It is usually 0.5 $mol \cdot dm^{-3}$ or higher, preferably 0.6 $mol \cdot dm^{-3}$ or higher, more preferably 0.8 $mol \cdot dm^{-3}$ or higher, and usually 3 $mol \cdot dm^{-3}$ or lower, preferably 2 $mol \cdot dm^{-3}$ or lower, more preferably 1.5 $mol \cdot dm^{-3}$ or lower. When the concentration is too low, the electric conductivity of the non-aqueous liquid electrolyte may be inadequate. When the concentration is too high, the electric conductivity decreases due to high viscosity, resulting in low performance of the non-aqueous electrolyte secondary battery based on the first non-aqueous liquid electrolyte of the present invention.

[I-5. Additive]

It is preferable that the first non-aqueous liquid electrolyte of present invention contains various additives to the extent that the advantage of the present invention is not significantly impaired. As the additive, any known ones can be used. The additive can be used either singly or as a mixture of more than one kind in any combination and in any ratio.

Examples of additives include overcharge-preventing agent and auxiliary agent used to improve capacity retention characteristics and cycle characteristics after the high temperature storage.

Concrete examples of overcharge-preventing additives are: aromatic compound such as biphenyl, alkyl biphenyl, terphenyl, partially hydrogenated terphenyl, cyclohexylbenene, t-butylbenzene, t-amylbenzene, diphenylether and dibenzofuran; partially fluorinated above aromatic compound such as 2-fluorobiphenyl, o-cyclohexylfluorobenzene and p-cyclohexylfluorobenzene; fluorine-containing anisole compound such as 2,4-difluoroanisole, 2,5-difluoroanislole and 2,6-difluoroanisole.

These overcharge-preventing additives can be used either singly or as a mixture of more than one kind in any combination and in any ratio.

When the first non-aqueous liquid electrolyte of the present invention contains overcharge-preventing additive, no particular limitation is imposed on its concentration used, insofar as the advantage of the present invention is not significantly impaired. Its content in the non-aqueous liquid electrolyte is preferably 0.1 weight % or higher, and 5 weight % or lower. By incorporating the overcharge-preventing additive in the non-aqueous liquid electrolyte, it is possible to prevent rupture and ignition caused by overcharge of the non-aqueous liquid electrolyte secondary battery, which preferably contributes to the enhancement of safety of the non-aqueous liquid electrolyte secondary battery.

On the other hand, concrete examples of auxiliary agent used to improve capacity retention characteristics and cycle characteristics after the high temperature storage are: anhydrides of dicarboxylic acid such as succinic acid, maleic acid and phthalic acid; carbonate compounds except those designated as specific carbonates, such as erystan carbonate and spiro-bis-dimethylene carbonate; sulfur-containing compounds such as ethylene sulfite, 1,3-propane sultone, 1,4-butane sultone, methyl methanesulfonate, busulfane, sulforane, sulforene, dimethyl sulfone, diphenyl sulfone, methylphenyl sulfone, dibutyl disulfide, dicyclohexyl disulfide, tetramethylthiuram monosulfide, N,N-dimethylmethane sulfonamide and N,N-diethylmethane sulfonamide; nitrogen-containing compounds such as 1-methyl-2-pyrrolidinone, 1-methyl-2-piperidone, 3-methyl-2-oxazolidinone, 1,3-dimethly-2-imidazolidinone and N-methylsuccinimide; hydrocarbon compounds such as heptane, octane and cycloheptane; and fluorine-containing aromatic compounds such as fluorobenzene, difluorobenene and benzotrifluoride.

These auxiliary agents can be used either singly or as a mixture of more than one kind in any combination and in any ratio.

When the first non-aqueous liquid electrolyte of the present invention contains the auxiliary agent, no limitation is imposed on its concentration, insofar as the advantage of the present invention is not significantly impaired. Usually, it is preferable that its concentration in the entire non-aqueous liquid electrolyte is 0.1 weight % or higher and 5 weight % or lower.

[II. First Non-aqueous Liquid Electrolyte Secondary Battery]

Next, explanation will be given on the non-aqueous liquid electrolyte secondary battery, based on the first non-aqueous liquid electrolyte of the present invention (hereafter abbreviated as "first non-aqueous liquid electrolyte secondary battery of the present invention") mentioned above.

The first non-aqueous liquid electrolyte secondary battery of the present invention comprises a anode electrode and a cathode electrode, capable of intercalating and deintercalating lithium ions, and a non-aqueous liquid electrolyte, the anode electrode containing a anode electrode active material having at least one kind of atom selected from the group consisting of Si atom, Sn atom and Pb atom, wherein said non-aqueous liquid electrolyte is the first non-aqueous liquid electrolyte of the present invention mentioned above.

[II-1. Constitution of Battery]

Constitution of the first non-aqueous liquid electrolyte secondary battery of the present invention is similar to that of the known non-aqueous liquid electrolyte secondary battery except the constitution of the anode electrode and non-aqueous liquid electrolyte. Usually, the cathode electrode and anode electrode are layered with a porous membrane (a separator) interposed therein, which is impregnated with the first non-aqueous liquid electrolyte of the present invention, and the whole structure is stored in a case (an outer package). There is no special limitation on the shape of the first non-aqueous liquid electrolyte secondary battery of the present invention. The shape may be cylindrical, prismatic, laminated, coin-like or large size-type.

[II-2. Non-aqueous Liquid Electrolyte]

As non-aqueous liquid electrolyte, the first non-aqueous liquid electrolyte of the present invention, described above, is used. Other non-aqueous liquid electrolyte can be added to the first non-aqueous liquid electrolyte of the present invention to such an extent that it does not depart from the scope of the present invention.

[II-3. Anode Electrode]

The anode electrode of the first non-aqueous liquid electrolyte secondary battery of the present invention comprises anode electrode active material having at least one kind of atom selected from the group consisting of Si atom, Sn atom and Pb atom (hereafter referred to as "specific metal element" as appropriate).

As examples of anode electrode active material containing at least one element selected from the specific metal elements can be cited: any one specific metal element alone; alloys consisting of two or more kinds of the specific metal elements; alloys consisting of one or more of the specific metal elements and one or more other metal elements; and compounds containing one or more of the specific metal elements. It is possible to realize higher capacity of the battery by using these metal elements, alloys or metal compounds as anode electrode active material.

As examples of compounds containing one or more of the specific metal elements can be cited complex compounds, such as carbide, oxide, nitride, sulfide and phosphide, containing one or more of the specific metal elements.

Also cited are compounds in which these complex compounds are further connected to other metal elements, alloys or several elements such as non-metal elements in a complicated manner. More concrete examples are alloys of Si or Sn with a metal not reacting as anode electrode. Also usable are complex compounds containing 5 or 6 elements, in which Sn, for example, is combined with a metal which is other than Si, Sn and Pb and is capable of acting as anode electrode, a metal not reacting as anode electrode and a non-metal element.

Of these anode electrode active materials, preferable are: any one kind of the specific metal elements used alone, alloys of two or more kinds of the specific metal elements, and oxides, carbides or nitrides of the specific metal elements, as they have large capacity per unit weight when made into the battery. Particularly preferable are metal elements, alloys, oxides, carbides and nitrides of Si and/or Sn, from the standpoint of capacity per unit weight and small burden on the environment.

Also preferable are the following Si and/or Sn-containing compounds because of their excellent cycle characteristics, although they are inferior to metal alone or alloy in capacity per unit weight.

Oxides of Si and/or Sn in which the ratio of Si and/or Sn and oxygen is usually 0.5 to 1.5, preferably 0.7 to 1.3, more preferably 0.9 to 1.1.

Nitrides of Si and/or Sn in which the ratio of Si and/or Sn and nitrogen is usually 0.5 to 1.5, preferably 0.7 to 1.3, more preferably 0.9 to 1.1.

Carbides of Si and/or Sn in which the ratio of Si and/or Sn and carbon is usually 0.5 to 1.5, preferably 0.7 to 1.3, more preferably 0.9 to 1.1.

The above anode electrode active material can be used either singly or as a mixture of more than one kind in any combination and in any ratio.

The anode electrode of the first non-aqueous liquid electrolyte secondary battery of the present invention can be produced according to a known method. Specifically, the anode electrode can be produced using the above-mentioned anode electrode active material combined with binder, electroconductor or the like, directly by roll-molding into a sheet electrode, or by compression-molding into a pellet electrode, for example. However, it is usually produced by forming a thin layer containing the above anode electrode active material (anode electrode active material layer) on a current collector for a anode electrode (hereinafter, referred to as "anode electrode current collector" as appropriate) by means of coating, vapor deposition, spattering, plating or the like. In this case, the above anode electrode active material is mixed with, for example, binder, thickener, electroconductor, solvent or the like to be made into the form of slurry. Then the slurry is applied to the anode electrode current collector, dried and pressed to increase its density, thereby the anode electrode active material layer being formed on the anode electrode current collector.

As materials of anode electrode current collector can be cited steel, copper alloy, nickel, nickel alloy and stainless steel. Of these materials, preferable is copper foil, because of its thin-layer formability and low cost.

The thickness of the anode electrode current collector is usually 1 μm or greater, preferably 5 μm or greater, and usually 100 μm or less, preferably 50 μm or less. When the anode electrode current collector is too thick, the capacity of the entire battery may become too low. On the other hand, when it is too thin, its handling is sometimes difficult.

In order to increase the bindability of the anode electrode current collector to the anode electrode active material layer formed thereon, it is preferable that the surface of the anode electrode current collector is subjected to roughening procedure in advance. Examples of surface roughening methods include: blasting procedure; rolling with a rough-surfaced roll; mechanical polishing in which the collector surface is polished with such means as an abrasive cloth or abrasive paper onto which abradant particles are adhered, a whetstone, an emery buff and a wirebrush equipped with steel wire; electropolishing; and chemical polishing.

In order to decrease the weight of the anode electrode current collector and increase energy density of the battery per unit weight, it is also possible to use a perforated-type anode electrode current collectors such as an expanded metal or a punching metal. This type of anode electrode current collector is freely adjustable in its weight by means of adjusting its ratio of perforation. Besides, when the anode electrode active material layer is formed on both sides of this perforated-type of anode electrode current collector, the anode electrode active material layer is riveted at these perforations and becomes resistant to exfoliation of the anode electrode active material layer. However, if the ratio of perforation is too high, bond strength may rather decrease because the contact area between the anode electrode active material layer and the anode electrode current collector becomes too small.

Slurry for making the anode electrode active material layer is usually prepared by adding such agents as binder and thickener to the anode electrode material. Incidentally, in this specification, the term "anode electrode material" indicates a material containing both anode electrode active material and electroconductor.

The content of the anode electrode active material in the anode electrode material is usually 70 weight % or higher, preferably 75 weight % or higher, and usually 97 weight % or lower, preferably 95 weight % or lower. When the content of the anode electrode active material is too low, the capacity of the secondary battery based on the anode electrode obtained tends to be insufficient. When the content is too high, the relative content of the binder etc. becomes low, leading to insufficient strength of the anode electrode. When two or more kinds of anode electrode active materials are combined, the sum of the materials should fall within the above range.

As electroconductor to be used for the anode electrode can be cited metal material such as copper and nickel, and carbon materials such as graphite and carbon black. These materials can be used either singly or as a mixture of more than one kind in any combination and in any ratio. Carbon material can be advantageously used as electroconductor, as this material can also function as active material. The content of the electroconductor in the anode electrode material is usually 3 weight % or higher, preferably 5 weight % or higher, and usually 30 weight % or lower, preferably 25 weight % or lower. When the content of the electroconductor is too low, conductivity may be inadequate. When it is too high, the relative content of the anode electrode active material may be inadequate, leading to a decrease in battery capacity and mechanical strength. When two or more electroconductors are combined, the total content of the electroconductors should be adjusted to fall within the above range.

As binder to be used for the anode electrode, any such material can be used insofar as it is stable in a solvent used for electrode production and in a liquid electrolyte. As examples can be cited polyfluorinated vinylidene, polytetrafluoro ethylene, polyethylene, polypropylene, styrene butadiene rubber, isoprene rubber, butadiene rubber, ethylene acrylic acid copolymer and ethylene metacrylic acid copolymer. These binders can be used either singly or as a mixture of more than one kind in any combination and in any ratio. The content of the binder per 100 weight parts of the anode electrode material is usually 0.5 weight part or more, preferably 1 weight part or more, and usually 10 weight parts or less, preferably 8 weight parts or less. When the content of the binder is too small, mechanical strength of the anode electrode obtained tends to be insufficient. When the content is too high, the relative content of the anode electrode active material is low, leading possibly to insufficient battery capacity and conductivity. When two or more binders are combined, the total content of the binders should be adjusted to fall within the above range.

As thickener to be used for the anode electrode can be cited carboxymethyl cellulose, methyl cellulose, hydroxymethyl cellulose, ethyl cellulose, polyvinyl alcohol, oxidized starch, phosphorylated starch and casein. These may be used either singly or as a mixture of more than one kind in any combination and in any ratio. The thickener may be used when considered necessary. When it is used, it is preferable that its content in the anode electrode active material is usually held at 0.5 weight % or higher, and 5 weight % or lower.

Slurry for making the anode electrode active material layer is usually prepared by mixing, as needed, electroconductor, binder or thickener with the above anode electrode active material, using aqueous solvent or organic solvent as dispersion medium. As aqueous solvent, water is usually used. It is also possible to mix other solvent, e.g. alcohol such as ethanol or cyclic amide such as N-methylpyrrolidone, in a ratio not exceeding about 30 weight % relative to water. Examples of organic solvent usually used include: cyclic amides such as N-methylpyrrolidone; straight chain amides such as N,N-dimethylformamide and N,N-dimethylacetamide; aromatic hydrocarbons such as anisole, toluene and xylene; and alcohols such as butanol and cyclohexanol. Of these, preferable are cyclic amides, such as N-methylpyrrolidone, and straight chain amides, such as N,N-dimethylformamide and N,N-dimethylacetamide. These solvents can be used either singly or as a mixture of more than one kind in any combination and in any ratio.

No particular limitation is imposed on the viscosity of the slurry, insofar as the slurry can be applied on the current collector. The amount of the solvent used at the time of slurry preparation can be adjusted appropriately to give a suitable viscosity for application.

Slurry obtained is applied on the above anode electrode current collector, and after drying and pressing, anode electrode active material layer is formed. No particular limitation is imposed on the method of application and known methods can be used. No particular limitation is imposed on the method of drying either, and per se known methods such as air drying, heated-air drying and reduced-pressure drying can be used.

There is no special limitation on the electrode structure when anode electrode active material is made into an electrode by the above-mentioned method. The density of the active material on the current collector is preferably 1 g·cm$^{-3}$ or higher, more preferably 1.2 g cm$^{-3}$ or higher, still more preferably 1.3 g·cm$^{-3}$ or higher, and usually 2 g·cm$^{-3}$ or lower, preferably 1.9 g-cm$^{-3}$ or lower, more preferably 1.8 g·cm$^{-3}$ or lower, still more preferably 1.7 g·cm$^{-3}$ or lower. When the density exceeds the above-mentioned upper limit, active material particles are destroyed and an increase in initial irreversible capacity and deterioration in charge-discharge characteristic under high current densities, caused by decrease in immersibility of the non-aqueous liquid electrolyte near the interface of the current collector/active material, may result. When the density is below the above range, conductivity in the active material may be poor, battery resistance may increase and capacity per unit volume may be low.

[II-4. Cathode Electrode]

The cathode electrode of the first non-aqueous liquid electrolyte secondary battery of the present invention contains cathode electrode active material, similarly to a usual non-aqueous liquid electrolyte secondary battery.

Examples of cathode electrode active material include inorganic compounds such as transition metal oxides, composite oxides of transition metal and lithium (lithium transition metal composite oxide), transition metal sulfides and metal oxides, and metal lithium, lithium alloys and their composites. Concrete examples are: transition metal oxides such as MnO, $V_2O_5$, $V_6O_{13}$ and $TiO_2$; lithium transition metal composite oxides such as $LiCoO_2$ or lithium cobalt composite oxide whose basic composition is $LiCoO_2$, $LiNiO_2$ or lithium nickel composite oxide whose basic composition is $LiNiO_2$, $LiMn_2O_4$ or $LiMnO_2$ or lithium manganese composite oxide whose basic composition is $LiMn_2O_4$ or $LiMnO_2$, lithium nickel manganese cobalt composite oxide and lithium nickel cobalt aluminum composite oxide; transition metal sulfides such as TiS and FeS and metal oxides such as $SnO_2$ and $SiO_2$. Of these compounds, preferable are lithium transition metal composite oxides, more concretely $LiCoO_2$ or lithium cobalt composite oxide whose basic composition is $LiCoO_2$, $LiNiO_2$ or lithium nickel composite oxide whose basic composition is $LiNiO_2$, $LiMn_2O_4$ or $LiMnO_2$ or lithium manganese composite oxide whose basic composition is $LiMn_2O_4$ or $LiMnO_2$, lithium nickel manganese cobalt composite oxide and lithium nickel cobalt aluminum composite oxide, because they can provide both high capacity and excellent cycle characteristics. Lithium transition metal composite oxides are preferable also because their chemical stability can be improved by replacing a part of cobalt, nickel or manganese in the lithium transition metal composite oxide with other metals such as Al, Ti, V, Cr, Mn, Fe, Co, Li, Ni, Cu, Zn, Mg, Ga or Zr, because. These cathode electrode active materials can be used either singly or as a mixture of more than one material in any combination and in any ratio.

The cathode electrode of the first non-aqueous liquid electrolyte secondary battery of the present invention can be produced according to a known method. Concretely, for example, the cathode electrode can be produced using the above-mentioned cathode electrode active material combined with binder, electroconductor or the like, directly by roll-molding into a sheet electrode, by compression-molding into a pellet electrode, by means of forming a cathode electrode active material layer applying the active material on a current collector for a cathode electrode (hereinafter, referred to as "cathode electrode current collector" as appropriate) (coating method), or by means of forming a thin layer (cathode electrode active material layer) containing the above cathode electrode active material on a current collector by vapor deposition, spattering, plating or the like. Usually, it is produced by the coating method.

When by the coating method, the above cathode electrode active material is mixed with, for example, binder, thickener, electroconductor, solvent or the like to be made into the form of slurry. Then the slurry is applied to the cathode electrode current collector, dried and pressed to increase its density, thereby the cathode electrode active material layer being formed on the cathode electrode current collector.

As materials of cathode electrode current collector can be cited aluminum, titanium, tantalum and alloy containing one or more of these metals. Of these, aluminum and its alloy are preferable.

The thickness of the cathode electrode current collector is usually 1 μm or greater, preferably 5 μm or greater, and usually 100 μm or less, preferably 50 μm or less. When the cathode electrode current collector is too thick, the capacity of the entire battery may become too low. On the other hand, when it is too thin, its handling is sometimes difficult.

In order to increase the bindability of the cathode electrode current collector to the cathode electrode active material layer formed thereon, it is preferable that the surface of the cathode electrode current collector is subjected to roughening procedure in advance. Examples of surface roughening methods include: blasting procedure; rolling with a rough-surfaced roll; mechanical polishing in which the collector surface is polished with such means as an abrasive cloth or abrasive paper onto which abradant particles are adhered, a whetstone, an emery buff and a wire brush equipped with steel wire; electropolishing; and chemical polishing.

In order to decrease the weight of the cathode electrode current collector and increase energy density of the battery per unit weight, it is also possible to use a perforated-type cathode electrode current collectors such as an expanded metal or a punching metal. This type of cathode electrode current collector is freely adjustable in its weight by means of adjusting its ratio of perforation. Besides, when the cathode electrode active material layer is formed on both sides of this perforated-type cathode electrode current collector, the cathode electrode active material layer is riveted at these perforations and becomes resistant to exfoliation of the cathode electrode active material layer. However, if the ratio of perforation is too high, bond strength may rather decrease because the contact area between the cathode electrode active material layer and the cathode electrode current collector becomes too small.

Usually, electroconductor is included in the cathode electrode active material layer in order to increase conductivity. There is no special limitation on the kind of electroconductor used. Concrete examples are metallic materials, such as copper and nickel, and carbonaceous material, e.g. graphite such as natural graphite and artificial graphite, carbon black such as acetylene black and amorphous carbon like needle coke. These materials can be used either singly or as a mixture of more than one kind in any combination and in any ratio.

The content of electroconductor in the cathode electrode active material layer is usually 0.01 weight % or higher, preferably 0.1 weight % or higher, more preferably 1 weight % or higher, and usually 50 weight % or lower, preferably 30 weight % or lower, more preferably 15 weight % or lower. When the content is too low, conductivity may be inadequate. When it is too high, capacity of the battery may decrease.

As binder to be used for the preparation of the cathode electrode active material layer, any such material can be used in the case of coating insofar as it is stable in a liquid medium used at the time of electrode preparation. Concrete examples are: resin polymers such as polyethylene, polypropylene, polyethylene terephthalate, polymethyl metacrylate, aromatic polyamide, cellulose and nitrocellulose; rubber-type polymers such as SBR (styrene butadiene rubber), NBR (acrylonitrile butadiene rubber), fluorinated rubber, isoprene rubber, butadiene rubber and ethylene propylene rubber; thermoplastic elastomer-type polymers such as styrene-butadiene-styrene block copolymer and its hydrogenated products, EPDM (ethylene-propylene-diene terpolymer), styrene ethylene butadiene ethylene copolymer, styrene isoprene styrene block copolymer and its hydrogenated product; soft resin polymers such as syndiotactic-1,2-polybutadiene, polyvinyl acetate, ethylene vinyl acetate copolymer and propylene α-olefin copolymer; fluorinated polymers such as polyfluorinated vinylidene, polytetrafluoroethylene, fluorinated polyfluorovinylidene and polytetrafluoroethylene ethylene copolymer; and high molecular composite materials having ionic conductivity for alkali metal ion (especially lithium ion). These materials can be used either singly or as a mixture of more than one material in any combination and in any ratio.

The content of the binder in the cathode electrode active material layer is usually 0.1 weight % or higher, preferably 1 weight % or higher, more preferably 5 weight % or higher, and usually 80 weight % or lower, preferably 60 weight % or lower, more preferably 40 weight % or lower, most preferably 10 weight % or lower. When the content of the binder is too low, the cathode electrode active material can not be adequately retained and mechanical strength of the cathode electrode may decrease, leading to deterioration of battery characteristics such as cycle characteristics. When the content is too high, battery capacity and conductivity may deteriorate.

As liquid medium for making slurry, any solvent can be used insofar as it can dissolve or disperse cathode electrode active material, electroconductor, binder and, as needed, thickener. Either aqueous solvent or organic solvent can be used.

Examples of aqueous solvent include water, and mixture of water and alcohol. Examples of organic solvent include: aliphatic hydrocarbons such as hexane; aromatic hydrocarbons such as benzene, toluene, xylene and methylnaphthalene; heteroaromatic compounds such as quinoline and pyridine; ketones such as acetone, methylethyl ketone and cyclohexanone; esters such as methyl acetate and methyl acrylate; amines such as diethylene triamine and N,N-dimethylaminopropylamine; ethers such as diethyl ether, propylene oxide and tetrahydrofuran (THF); amides such as N-methylpyrrolidone (NMP), dimethylformamide and dimethylacetamide; and non-protonic polar solvents such as hexamethylphosphoramide and dimethylsulfoxide.

Especially when an aqueous solvent is used, it is preferable to prepare the slurry using a thickener and latex such as styrene butadiene rubber (SBR). A thickener is usually used to adjust the viscosity of slurry. There is no limitation on the kind of thickener. As concrete examples can be cited carboxymethyl cellulose, methyl cellulose, hydroxymethyl cellulose, ethyl cellulose, polyvinyl alcohol, oxidized starch, phosphorylated starch, casein, and salts of these compounds. These compounds can be used either singly or as a mixture of more than one compound in any combination and in any ratio. When a thickener is used, the proportion of the thickener in the active material is usually 0.1 weight % or higher, preferably 0.5 weight % or higher, more preferably 0.6 weight % or higher, and usually 5 weight % or lower, preferably 3 weight % or lower, more preferably 2 weight % or lower. When the proportion is below the above range, coatability may be extremely low. When the proportion exceeds the above range, the ratio of the active material in the cathode electrode active material layer decreases and there is a possibility that battery capacity becomes low and resistance in the cathode electrode active materials become large.

No particular limitation is imposed on the viscosity of the slurry, insofar as the slurry can be applied on the current collector. The amount of the solvent used at the time of slurry preparation can be adjusted appropriately to give a suitable viscosity for application.

Slurry obtained is applied on the above cathode electrode collector, and after drying and pressing anode electrode active material layer is formed. No particular limitation is imposed on the method of application and known methods can be used. No particular limitation is imposed on the method of drying either, and per se known methods such as air drying, heated-air drying and reduced-pressure drying can be used.

It is preferable that the cathode electrode active material layer obtained through processes such as coating and drying is subjected to consolidation process by such means as hand pressing or roller pressing in order to increase packing density of the cathode electrode active material.

The density of the cathode electrode active material is preferably 1.5 g·cm$^{-3}$ or higher, more preferably 2 g·cm$^{-3}$ or higher, still more preferably 2.2 g·cm$^{-3}$ or higher, and preferably 3.5 g·cm$^{-3}$ or lower, more preferably 3 g·cm$^{-3}$ or lower, still more preferably 2.8 g·cm$^{-3}$ or lower. When the density exceeds the above-mentioned upper limit, a decrease in immersibility of the non-aqueous liquid electrolyte near the interface of the current collector/active material may occur and deterioration in charge-discharge characteristic under high current densities may result. When the density is below the above range, conductivity in the active material may be poor and battery resistance may increase.

[II-5. Separator]

Usually, a separator is installed between the cathode electrode and the anode electrode to prevent shortings. In the case, the first non-aqueous liquid electrolyte of the present invention is usually used in such a way that the separator is impregnated with this liquid electrolyte.

There is no special limitation on the material or shape of the separator insofar as the advantage of the present invention is not significantly impaired. Any known ones can be used. It is particularly preferable to use porous sheet or nonwoven fabric, with good water-retaining characteristics, which is made of material stable in the non-aqueous liquid electrolyte of the present invention.

As materials of the separator can be used: polyolefin such as polyethylene and polypropylene, polytetrafluoroethylene, polyether sulfone and glass filter. Of these materials, preferably are glass filter and polyolefin. Particularly preferable is polyolefin. These materials can be used either singly or as a mixture of more than one kind in any combination and in any ratio.

No particular limitation is imposed on the thickness of the separator. It is usually 1 μm or greater, preferably 5 μm or greater, more preferably 10 μm or greater, and usually 50 μm or less, preferably 40 μm or less, more preferably 30 μm or less. When the separator is too thin, insulation property and mechanical strength may deteriorate. When it is too thick, battery characteristics such as rate characteristics may deteriorate and also energy density of the entire non-aqueous liquid electrolyte secondary battery may decline.

When porous material such as porous sheet or nonwoven fabric is used as separator, there is no special limitation on the porosity of the separator. It is usually 20% or larger, preferably 35% or larger, more preferably 45% or larger, and usually 90% or smaller, preferably 85% or smaller, more preferably 75% or smaller. When the porosity is too small, membrane resistance may become large and rate characteristics may deteriorate. When it is too large, mechanical strength of the separator may decrease, leading to poor insulation property.

No particular limitation is imposed on the average pore diameter of the separator. Usually, it is 0.5 μm or smaller, preferably 0.2 μm or smaller, and usually 0.05 μm or larger. When the average pore diameter is too large, shortings are liable to occur. When it is too small, membrane resistance may become large and rate characteristics may deteriorate.

[II-6. Outer Package]

The first non-aqueous liquid electrolyte secondary battery of the present invention is usually constituted by storing the above non-aqueous liquid electrolyte, anode electrode, cathode electrode and separator or the like in an outer package. There is no special limitation on this outer package and any known one can be used insofar as the advantageous effect of the present invention is not significantly impaired.

Concretely, there is no special limitation on the material of the outer package. Usually, nickel-plated iron, stainless steel, aluminum and its alloys, nickel and titanium are used.

There is no limitation on the shape of the outer package, either. The shape may be cylindrical, prismatic, laminated, coin-like or large size.

[III. Others]

[III-1. Second Non-aqueous Liquid Electrolyte and Non-Aqueous Liquid Electrolyte Secondary Battery]

The above-mentioned component (i)(specific compound (I) and the saturated cyclic carbonate) may improve charge-discharge cycle characteristics of the non-aqueous liquid electrolyte secondary battery even when specific carbonate is not combined in the non-aqueous liquid electrolyte. In the following, explanation will be given on the non-aqueous liquid electrolyte which contains component (i)(specific compound (I) and the saturated cyclic carbonate) and does not require the specific carbonate (non-aqueous liquid electrolyte related to the second subject of the present invention. Hereafter abbreviated as "second non-aqueous liquid electrolyte" as appropriate) and the non-aqueous liquid electrolyte secondary battery based on it (abbreviated as "second non-aqueous liquid electrolyte secondary battery of the present invention" as appropriate).

The second non-aqueous liquid electrolyte of the present invention is a non-aqueous liquid electrolyte to be used for a non-aqueous liquid electrolyte secondary battery comprising a anode electrode and a cathode electrode, capable of intercalating and deintercalating lithium ions, and a non-aqueous liquid electrolyte, the anode electrode containing a anode electrode active material having at least one kind of atom selected from the group consisting of Si atom, Sn atom and Pb atom (specific metal element).

The second non-aqueous liquid electrolyte is characterized in that it contains the above-mentioned component (i), namely the above-mentioned specific compound (I) and saturated cyclic carbonate. The details of the specific compound (I) and saturated cyclic carbonate are similar to what has been described in <I-1-1. Component (i)>. The ratio of specific compound (I) and the saturated cyclic carbonate in the second non-aqueous liquid electrolyte is also similar to the ratio of specific compound (I) and the saturated cyclic carbonate in the non-aqueous liquid electrolyte (I) described in <I-1-1. Component (i)>.

The details (requirement, kind, ratio etc.) of components other than specific compound (I) and the saturated cyclic carbonate (non-aqueous solvent, electrolyte, additive etc.) of the second non-aqueous liquid electrolyte are similar to what has been described in each item ([I-3. Non-aqueous solvent], [I-4. Electrolyte], [I-5. Additive]) for the above-mentioned [I. First non-aqueous liquid electrolyte].

The use of the second non-aqueous liquid electrolyte may improve charge-discharge cycle characteristics of the non-aqueous liquid electrolyte secondary battery based on the anode electrode active material containing the above-mentioned specific metal element, even though it does not contain the specific carbonate, as described above. The detailed reason is not clear but inferred as follows.

Namely, chemical reactivity of specific compound (I) of the second non-aqueous liquid electrolyte towards anode electrode active material containing the above specific metal element is held low by the presence of alkyl group or fluoroalkyl group with 3 or more carbon atoms. Side reactions are thus suppressed and cycle deterioration is evaded. Similar effect is obtained when the total number of carbon atoms of alkyl or fluoroalkyl groups of specific compound (I) is 5 or more. And the solubility of the electrolytes becomes higher by the presence of saturated cyclic carbonate combined with specific compound (I), leading to improvement in charge-discharge cycle characteristics.

The details of the non-aqueous liquid electrolyte secondary battery based on the second non-aqueous liquid electrolyte (second non-aqueous liquid electrolyte secondary battery), except those for the non-aqueous liquid electrolyte, are similar to what has been described in each item ([II-1. Constitution of battery], [II-3. Anode electrode], [II-4. Cathode electrode], [II-5. Separator], [II-6. Outer package]) for the above-mentioned [II. First non-aqueous liquid electrolyte secondary battery].

The advantageous effect, however, is more pronounced when the specific carbonate is present in the non-aqueous liquid electrolyte in addition to specific compound (I) and saturated cyclic carbonate (namely, the above-mentioned first non-aqueous liquid electrolyte (I)) in comparison with the non-aqueous liquid electrolyte without specific carbonate (namely, second non-aqueous liquid electrolyte). As described previously, it is inferred that, when the specific carbonate is combined with specific compound (I) and saturated cyclic carbonate, a protective layer is formed on the surface of the anode electrode active material and side reaction is suppressed also, leading to improvement in property of the protective layer.

[III-2. Third Non-aqueous Liquid Electrolyte and Non-Aqueous Liquid Electrolyte Secondary Battery]

The above-mentioned specific compound (II) may improve charge-discharge cycle characteristics of the non-aqueous liquid electrolyte secondary battery when it is included in the non-aqueous liquid electrolyte singly and the specific carbonate is not combined. In the following, explanation will be given on the non-aqueous liquid electrolyte which contains specific compound (II) and does not require the specific carbonate (non-aqueous liquid electrolyte related to the third subject of the present invention. Hereafter abbreviated as "third non-aqueous liquid electrolyte" as appropriate) and the non-aqueous liquid electrolyte secondary battery based on it (abbreviated as "third non-aqueous liquid electrolyte secondary battery of the present invention" as appropriate).

The third non-aqueous liquid electrolyte of the present invention is a non-aqueous liquid electrolyte to be used for a non-aqueous liquid electrolyte secondary battery comprising a anode electrode and a cathode electrode, capable of intercalating and deintercalating lithium ions, and a non-aqueous liquid electrolyte, the anode electrode containing a anode electrode active material having at least one kind of atom selected from the group consisting of Si atom, Sn atom and Pb atom (specific metal element).

The third non-aqueous liquid electrolyte is characterized in that it contains the above-mentioned specific compound (II). The details of the specific compound (II) are similar to what has been described in <I-1-2. Component (ii)>. The ratio of specific compound (II) in the third non-aqueous liquid electrolyte is also similar to the ratio of specific compound (II) in the non-aqueous liquid electrolyte (II) described in <I-1-2. Component (ii)>.

The details (requirement, kind, ratio etc.) of components other than specific compound (II)(non-aqueous solvent, electrolyte, additive etc.) of the third non-aqueous liquid electrolyte are similar to what has been described in each item ([I-3. Non-aqueous solvent], [I-4. Electrolyte], [I-5. Additive]) for the above-mentioned [I. First non-aqueous liquid electrolyte].

The use of the third non-aqueous liquid electrolyte makes it possible to improve charge-discharge cycle characteristics of the non-aqueous liquid electrolyte secondary battery based on the anode electrode active material containing the above-mentioned specific metal element, even though it does not contain the specific carbonate, as described above. The detailed reason is not clear but inferred that the specific compound (II) forms an efficient protective layer on the surface of the anode electrode active material, thereby suppressing side reactions and inhibiting cycle deterioration.

The details of the non-aqueous liquid electrolyte secondary battery based on the third non-aqueous liquid electrolyte (third non-aqueous liquid electrolyte secondary battery), except those for the non-aqueous liquid electrolyte, are similar to what has been described in each item ([II-1. Constitution of battery], [II-3. Anode electrode], [II-4. Cathode electrode], [II-5. Separator], [II-6. Outer package]) for the above-mentioned [II. First non-aqueous liquid electrolyte secondary battery].

The advantageous effect, however, is more pronounced when the specific carbonate is present in the non-aqueous liquid electrolyte in addition to specific compound (II) (namely, the above-mentioned first non-aqueous liquid electrolyte (II)) in comparison with the non-aqueous liquid electrolyte without specific carbonate (namely, third non-aqueous liquid electrolyte). As described previously, it is inferred that, when the specific carbonate is combined with specific compound (II), a protective layer is formed on the surface of the anode electrode active material and side reaction is suppressed also, leading to improvement in property of the protective layer.

[III-3. Fourth Non-aqueous Liquid Electrolyte and Non-Aqueous Liquid Electrolyte Secondary Battery]

The non-aqueous liquid electrolyte containing both above-mentioned specific compound (III) and the specific carbonate may improve charge-discharge cycle characteristics not only in non-aqueous liquid electrolyte secondary battery based on anode electrode active material having at least one kind of atom selected from the group consisting of Si atom, Sn atom and Pb atom (specific metal element), but also in non-aqueous liquid electrolyte secondary battery based on other anode electrode active material (non-aqueous liquid electrolyte based on graphite material etc.). In the following, explanation will be given on the non-aqueous liquid electrolyte which has no limitation on the kind of anode electrode active material (non-aqueous liquid electrolyte related to the fourth subject of the present invention. Hereafter abbreviated as "fourth non-aqueous liquid electrolyte" as appropriate), and the non-aqueous liquid electrolyte secondary battery based on that non-aqueous liquid electrolyte (hereafter referred to as "fourth non-aqueous liquid electrolyte secondary battery of the present invention" as appropriate).

The fourth non-aqueous liquid electrolyte of the present invention is a non-aqueous liquid electrolyte to be used for a non-aqueous liquid electrolyte secondary battery comprising a anode electrode and a cathode electrode, capable of intercalating and deintercalating lithium ions, and a non-aqueous liquid electrolyte. It is characterized in that it contains the above-mentioned specific compound (III) and specific carbonate.

The details of the specific compound (III) and specific carbonate are similar to what has been described in <I-1-3. Component (iii)> and [1-2. Specific carbonate]. The proportion of the specific compound (III) and specific carbonate in the fourth non-aqueous liquid electrolyte is also similar to the proportion of the specific compound (III) and specific carbonate in the non-aqueous liquid electrolyte (III) described in <I-1-3. Component (iii)> and [1-2. Specific carbonate].

The details (requirement, kind, ratio etc.) of components other than specific compound (III) and specific carbonate (non-aqueous solvent, electrolyte, additive etc.) of the fourth non-aqueous liquid electrolyte are similar to what has been described in each item ([I-3. Non-aqueous solvent], [I-4. Electrolyte], [I-5. Additive]) for the above-mentioned [I. First non-aqueous liquid electrolyte].

The non-aqueous liquid electrolyte secondary battery based on the fourth non-aqueous liquid electrolyte (fourth non-aqueous liquid electrolyte secondary battery) differs from the above-mentioned first non-aqueous liquid electrolyte secondary battery in that there is no limitation on the kind of anode electrode active material that can be used. In the following, explanation will be given on the anode electrode active material that can be used for the fourth non-aqueous liquid electrolyte secondary battery.

No particular limitation is imposed on the anode electrode active material. Examples include carbonaceous materials, metal materials, metal lithium and lithium alloys, which are capable of intercalating and deintercalating lithium. Further, the anode electrode active materials can be used either singly or as a mixture of more than one kind in any combination and in any ratio.

Of these, preferable are carbonaceous materials, alloys consisting of lithium and more than one kind of metal capable of intercalating and deintercalating lithium, and composite compound materials such as borides, oxides, nitrides, sulfides and phosphides of these metals.

Any carbonaceous material can be used as anode electrode active material. Preferable are graphite, and graphite whose surface is covered with carbon which is more amorphous than graphite.

For the above-mentioned graphite, it is preferable that the d value (interlayer distance) of the lattice plane (002 plane), obtained by X ray diffraction according to the Gakushin method, is usually 0.335 nm or larger, and usually 0.338 nm or smaller, preferably 0.337 nm or smaller.

Furthermore, it is preferable for the graphite that its crystallite size (Lc), obtained by X ray diffraction according to the Gakushin method, is usually 30 nm or larger, more preferably 50 nm or larger, still more preferably 100 nm or larger.

The ash content of the graphite is usually 1 weight % or less, preferably 0.5 weight % or less, more preferably 0.1 weight % or less.

When the surface of the graphite is covered with amorphous carbon, it is preferable to use as nucleus material graphite whose d value of the lattice plane (002 plane), obtained by X ray diffraction, is usually 0.335 nm to 0.338 nm, and to use as covering material carbonaceous material whose d value of the lattice plane (002 plane), obtained by X ray diffraction, is larger than that of the nucleus material. Furthermore, it is preferable that the weight ratio of the nucleus material and the covering material whose d value of the lattice plane (002 plane), obtained by X ray diffraction, is larger than that of the nucleus material is usually in the range of 99/1 to 80/20. The use of this material makes possible the production of anode electrode with high capacity and low reactivity towards the non-aqueous liquid electrolyte.

There is no special limitation on the particle diameter of the carbonaceous material, insofar as the advantage of the present invention is not significantly impaired. The median diameter, measured by the laser diffraction-scattering method is usually 1 µm or larger, preferably 3 µm or larger, more preferably 5 µm or larger, still more preferably 7 µm or larger. On the other hand, its upper limit is usually 100 µm or smaller, preferably 50 µm or smaller, more preferably 40 µm or smaller, still more preferably 30 µm or smaller. When the diameter is below the lower limit of the above range, the specific surface area may be too large. When it exceeds the upper limit thereof, the specific surface area may be too small.

There is no special limitation on the specific surface area of the carbonaceous material, either, as measured by the BET method, insofar as the advantage of the present invention is not significantly impaired. It is usually 0.3 $m^2/g$ or larger, preferably 0.5 $m^2/g$ or larger, more preferably 0.7 $m^2/g$ or larger, still more preferably 0.8 $m^2/g$ or larger. On the other hand, its upper limit is usually 25.0 $m^2/g$ or smaller, preferably 20.0 $m^2/g$ or smaller, more preferably 15.0 $m^2/g$ or smaller, still more preferably 10.0 $m^2/g$ or smaller. When the value is below the lower limit of the above range, a sufficiently large area necessary for the insertion and release of lithium ions can not be secured. When the upper limit is exceeded, reactivity of the liquid electrolyte may be too high.

It is preferable that when the carbonaceous material is examined in accordance with Raman spectroscopy employing argon ion laser light, the R value ($=I_B/I_A$), represented by the ratio between the peak strength $I_A$ of peak spectrum $P_A$, existing in the range of 1570 $cm^{-1}$ to 1620 $cm^{-1}$, and the peak strength $I_B$ of peak spectrum $P_B$, existing in the range of 1300 $cm^{-1}$ to 1400 $cm^{-1}$, of the carbonaceous material is in the range of usually 0.01 or larger and 0.7 or smaller, from the standpoint of realizing effective battery characteristics.

In this connection, it is preferable for good battery characteristics that, when carbonaceous material is subjected to Raman spectrum analysis using argon ion laser light, the half-height width of the peak appearing in the range of 1570 $cm^{-1}$ to 1620 $cm^{-1}$ is usually 26 $cm^{-1}$ or less, more preferably 25 $cm^{-1}$ or less When alloy consisting of lithium and one or more kind of metal capable of intercalating and deintercalating lithium, or composite compound material such as boride, oxide, nitride, sulfide or phosphide of these metals is used as anode electrode active material, it is possible to use, as the alloy or composite compound material, alloy containing more than one metal element or, further, its composite compound material. For example, it is also possible to use materials in which metal alloys or boride, oxide, nitride, sulfide or phosphide of these alloys are chemically bonded in a complex manner.

Of the anode electrode active materials consisting of the above alloy or composite compound material, preferable are those containing Si, Sn or Pb, and particularly preferable are those containing Si or Sn, from the standpoint of large capacity per unit weight of the anode electrode when made into a non-aqueous liquid electrolyte secondary battery.

The proportion of the anode electrode active material and the details of the anode electrode of the fourth non-aqueous liquid electrolyte secondary battery, except those of the anode electrode active material, are similar to what has been described in [II-3. Anode electrode] of the above-mentioned [II. First non-aqueous liquid electrolyte secondary battery].

The details of the fourth non-aqueous liquid electrolyte secondary battery, except those for the non-aqueous liquid electrolyte and the anode electrode, are similar to what has been described in each item ([II-1. Constitution of battery], [II-4. Cathode electrode], [II-5. Separator], [II-6. Outer packaging]) of the above-mentioned [II. First non-aqueous liquid electrolyte secondary battery].

As described above, the fourth non-aqueous liquid electrolyte can bring about improvement in charge-discharge cycle characteristics of not only the non-aqueous liquid electrolyte secondary battery based on anode electrode active material containing specific metal element, but also the battery based on various anode electrode active material. Although detailed reason is not clear, it is inferred that, similarly to what has been described for the first non-aqueous liquid electrolyte (non-aqueous liquid electrolyte (III)), an effective protective layer is formed on the surface of the anode electrode active material by the reactivity of both specific compound (III) and specific carbonate contained in the non-aqueous liquid electrolyte (III), and side reaction is thereby suppressed, leading to inhibition of cycle deterioration.

The advantageous effect, however, is more pronounced when the anode electrode active material containing the above specific metal element is used for the non-aqueous liquid electrolyte secondary battery (namely, first non-aqueous liquid electrolyte) than when other anode electrode active material is used for the non-aqueous liquid electrolyte secondary battery (namely, fourth non-aqueous liquid electrolyte).

EXAMPLES

The present invention will be explained in further detail below referring to examples. It is to be understood that any modification is possible to these examples insofar as it does not depart from the scope of the invention.

[Example•Comparative Example Group I]

Examples I-1 to I-14 and Comparative Examples I-1 to I-4

Non-aqueous liquid electrolyte secondary batteries were assembled by the following procedure and their performance were evaluated. The results are shown in Table I.

[Preparation of Anode Electrode]

<Preparation of Silicon Alloy Anode Electrode: Examples I-1 to I-14, Comparative Examples I-1, I-2>

As anode electrode active material were used 73.2 weight parts of silicon, a non-carbonaceous material, 8.1 weight parts of copper and 12.2 weight parts of artificial graphite powder (product of Timcar Co. "KS-6"). To the mixture were added 54.2 weight parts of N-methylpyrrolidone solution, containing 12 weight parts of polyvinylidene fluoride (hereafter abbreviated as "PVDF"), and 50 weight parts of N-methylpyrrolidone, and the mixture was made into slurry using a disperser. The slurry obtained was coated uniformly onto a copper film of 18 μm thickness, which is a anode electrode current collector. The coated film was first air-dried and finally reduced pressure-dried overnight at 85° C., and then pressed to give an electrode density of about 1.5 g·cm$^{-3}$. A disk of 12.5 mm diameter was stamped out to prepare the anode electrode (silicon alloy anode electrode).

<Preparation of Graphite Anode Electrode: Comparative Examples I-3, I-4>

As anode electrode was used 100 weight parts of artificial graphite powder (product of Timcar Co. "KS-6"). To this were added 83.5 weight parts of N-methylpyrrolidone, containing 12 weight parts of PVDF, and 50 weight parts of N-methylpyrrolidone, and the mixture was made into slurry using a disperser. The slurry obtained was coated uniformly onto a copper film of 18 μm thickness, which is a anode electrode current collector. The coated film was first air-dried and finally reduced pressure-dried overnight at 85° C., and then pressed to give an electrode density of about 1.5 g·cm$^{-3}$. A disk of 12.5 mm diameter was punched out to prepare the anode electrode (graphite anode electrode).

[Preparation of Cathode Electrode]

As cathode electrode active material was used 85 weight parts of LiCoO$_2$ (product of Nihon Kagaku Kogyo Co. "C5"). To this were added 6 weight parts of carbon black (product of Denki Kagaku Kogyo Co. "Denka Black") and 9 weight parts of polyvinylidene fluoride KF-1000 (product of Kureha Kagaku Co. "KF-1000"). After mixing, the mixture was dispersed into slurry using N-methyl-2-pyrrolidone. The slurry obtained was coated uniformly onto a aluminum film of 20 μm thickness, which is the cathode electrode current collector, so that its amount represents 90% of the theoretical capacity of the anode electrode. After drying at 100° C. for 12 hours, a disk of 12.5 mm diameter was stamped out to prepare the cathode electrode.

[Preparation of Non-Aqueous Liquid Electrolyte]

[Specific carbonate], [other compound] and [specific component] described in each [Example] and [Comparative Example] of Table I appearing later were mixed in a ratio specified in the Table. LiPF$_6$ was dissolved as electrolyte salt at a concentration of 1 mol·dm$^{-3}$ to prepare the non-aqueous liquid electrolyte (non-aqueous liquid electrolyte of Examples I-1 to I-14 and Comparative Examples I-1 to I-4).

[Preparation of Coin-Type Cell]

By using the above cathode electrode and anode electrode, and the non-aqueous liquid electrolyte prepared in each Example and Comparative Example, the coin-type cell (non-aqueous liquid electrolyte secondary battery of Examples I-1 to I-14 and Comparative Examples I-1 to I-4) was prepared by the following procedure: at 25° C., the cathode electrode was installed in a stainless steel can-body which also functions as cathode electrode current collector. Onto the cathode electrode installed, the anode electrode was placed with a separator, made of polyethylene and impregnated with the liquid electrolyte, interposed in both electrode. Then the can-body was sealed by caulking with a sealing pad, which also functions as anode electrode current collector, with a gasket for insulation interposed between the can-body and the pad, thereby the coin-type cell being prepared. As anode electrode, the above-mentioned silicon alloy anode electrode or graphite anode electrode was selected and used, according to the description of [anode electrode] column in each [Example] and [Comparative Example] of Table I appearing later.

For the coin-type cell obtained by the above procedure (non-aqueous liquid electrolyte secondary battery of Examples I-1 to I-14 and Comparative Examples I-1 to I-4), the discharge capacity and discharge capacity retention were evaluated by the following procedure: each coin-type cell was first charged with constant current and constant voltage at the charge termination voltage of 4.2V-3 mA and at the charge termination current of 0.15 μA, and then discharged with constant current at the discharge termination voltage of 3.0V-3 mA. This charge-discharge cycle was repeated 50 times. Discharge capacities at the 1st, 10th and 50th cycle were measured at this point. Discharge capacity retentions after the 10th cycle and 50th cycle were calculated according to the following formula.

discharge capacity retention (%) 100*(discharge capacity at the 10th or 50th cycle)/(discharge capacity at the 1st cycle)     [Mathematical Formula 1]

Discharge capacity at the 1st, 10th and 50th cycle and discharge capacity retention (%) at the 10th and 50th cycle obtained for the coin-type cell of each example and comparative example are shown in the column [battery evaluation] of Table I below. Values of discharge capacity shown in Table I indicate capacity per unit weight of anode electrode active material (mAh·g$^{-1}$). "Wt %" indicates "weight %".

[Table 1]

TABLE I

| | | | non-aqueous liquid electrolyte | | battery evaluation | | | | |
| --- | --- | --- | --- | --- | --- | --- | --- | --- | --- |
| | | | | | | | at the 10th cycle | | at the 50th cycle |
| Examples | | negative-electrode active material | combination of non-aqueous solvents (figures in parentheses means volume ratio)* | specific carbonate* | discharge capacity at the 1st cycle (mAh/g) | discharge capacity (mAh/g) | discharge capacity retention rate (%) | discharge capacity (mAh/g) | discharge capacity retention rate (%) |
| Examples | I-1 | Si Alloy | EC + EPC(30:70) | FEC(5 wt %) | 609 | 508 | 83.4 | 357 | 58.7 |
| | I-2 | | EC + EPC(30:70) | VC(5 wt %) | 605 | 495 | 81.9 | 352 | 58.2 |
| | I-3 | | EC + EPC(30:70) | DFEC(5 wt %) | 608 | 505 | 83.1 | 357 | 58.7 |
| | I-4 | | EC + FEC + EPC(15:15:70) | (contained as saturated cyclic carbonate) | 612 | 520 | 84.9 | 367 | 59.9 |
| | I-5 | | FEC + EPC(30:70) | (contained as saturated cyclic carbonate) | 608 | 515 | 84.7 | 359 | 59.1 |
| | I-6 | | FEC + EPC(30:70) | VC(5 wt %) | 603 | 520 | 86.3 | 341 | 56.5 |
| | I-7 | | EC + DPC + DEC(30:50:20) | VC(5 wt %) | 602 | 494 | 82.1 | 346 | 57.4 |
| | I-8 | | EC + EMFPC(30:70) | (contained as specific compound (I)) | 601 | 498 | 82.8 | 338 | 56.3 |

TABLE I-continued

|  | Examples | negative-electrode active material | non-aqueous liquid electrolyte combination of non-aqueous solvents (figures in parentheses means volume ratio)* | specific carbonate* | battery evaluation discharge capacity at the 1st cycle (mAh/g) | at the 10th cycle discharge capacity (mAh/g) | at the 10th cycle discharge capacity retention rate (%) | at the 50th cycle discharge capacity (mAh/g) | at the 50th cycle discharge capacity retention rate (%) |
|---|---|---|---|---|---|---|---|---|---|
|  | I-9 |  | EC + PTFEC(30:70) | (contained as specific compound (I)) | 600 | 499 | 83.1 | 337 | 56.2 |
|  | I-10 |  | FEC + EMFPC(30:70) | (contained as saturated cyclic carbonate and specific compound (I)) | 604 | 511 | 84.6 | 361 | 59.7 |
|  | I-11 |  | FEC + PTFEC(30:70) | (contained as saturated cyclic carbonate and specific compound (I)) | 606 | 516 | 85.1 | 357 | 58.9 |
|  | I-12 |  | FEC + EMFPC(30:70) | VC(5 wt %) | 604 | 519 | 86.0 | 358 | 59.2 |
|  | I-13 |  | EC + EPC(30:70) | — | 602 | 499 | 82.9 | 333 | 55.3 |
|  | I-14 |  | EC + DPC + DEC(30:50:20) | — | 598 | 492 | 82.2 | 328 | 54.9 |
| Comparative Examples | I-1 |  | EC + DMC(30:70) | — | 599 | 287 | 47.8 | 91 | 15.1 |
|  | I-2 |  | EC + EMC(30:70) | — | 603 | 321 | 53.2 | 113 | 18.7 |
|  | I-3 | graphite | EC + EMC(30:70) | — | 345 | 342 | 99.2 | 311 | 90.1 |
|  | I-4 |  | EC + EPC(30:70) | — | 338 | 332 | 98.3 | 290 | 85.8 |

*EC: ethylene carbonate (saturated cyclic carbonate)
FEC: fluoroethylene carbonate (saturated cyclic carbonate and specific carbonate; the number of substituting F is 1)
DFEC: 4,5-difluoroethylene carbonate (saturated cyclic carbonate and specific carbonate; the number of substituting F is 2)
EPC: ethyl n-propyl carbonate (specific compound (I); n = 3, m = 2)
DPC: dipropyl carbonate (specific compound (I); n = m = 3)
PTFEC: n-propyl trifluoroethyl carbonate (specific compound (I) and specific carbonate; n = 3, m = 2, the number of substituting F is 3)
EMFPC: ethyl 3-monofluoropropyl carbonate (specific compound (I) and specific carbonate; n = 3, m = 2, the number of substituting F is 1)
DEC: diethyl carbonate (other chain carbonate)
DMC: dimethyl carbonate (other chain carbonate)
EMC: ethyl methyl carbonate (other chain carbonate)

The results shown in Table I above indicate the following.

In Comparative Examples I-1 and I-2, the non-aqueous liquid electrolyte does not contain specific compound (I) (linear carbonate represented by the above general formula (I)) and therefore discharge capacity retention after cycle test is low in either case.

In Comparative Examples I-3 and I-4, carbon material is used as anode electrode active material. The non-aqueous liquid electrolyte in comparative example I-3 does not contain specific compound (I) and that in comparative example I-4 contains specific compound (I). However, comparison between Comparative Example I-3 and Comparative Example I-4 indicates that the use of specific compound (I) does not contribute to the improvement of discharge capacity retention after cycle test, because the anode electrode active material is carbon material. Therefore, when carbon material is used as anode electrode active material, enhancing effect for cycle characteristics can not be expected for specific compound (I).

On the other hand, in the non-aqueous liquid electrolyte secondary battery of Examples I-1 to I-12, where silicon alloy or the like is used as anode electrode active material and the non-aqueous liquid electrolyte containing specific compound (I), the saturated cyclic carbonate and the specific carbonate, the discharge capacity retention is improved remarkably in every case in comparison with comparative example I-1 and I-2, which indicates excellent cycle characteristics.

Furthermore, in Examples I-13 and I-14, where the non-aqueous liquid electrolyte contains specific compound (I) and the saturated cyclic carbonate but not the specific carbonate, discharge capacity retention after cycle test is greatly improved in comparison with Comparative Examples I-1 and I-2, although the degree of improvement is slightly less than that for the above Examples I-1 to I-12.

[Example•Comparative Example Group II]

[Examples II-1 to II-28 and Comparative Examples II-1 to II-14]

The non-aqueous liquid electrolyte secondary battery was assembled by the following procedure and its performance was evaluated. The results are shown in Tables II-1 to II-6.

[Preparation of Anode Electrode]

<Preparation of Silicon Alloy Anode Electrode: Examples II-1 to II-28, Comparative Examples II-1 to II-3, II-9, II-10>

The anode electrode (silicon alloy anode electrode) was prepared by the same method as described in the section <preparation of silicon alloy anode electrode> of the above-mentioned [Example•Comparative Example Group I].

<Preparation of Graphite Anode Electrode: Examples II-4 to II-8, II-11 to II-14>

The anode electrode (graphite anode electrode) was prepared by the same method as described in the section <preparation of graphite anode electrode> of the above-mentioned [Example•Comparative Example Group I].

[Preparation of Cathode Electrode]

The cathode electrode was prepared by the same method as described in the section <Preparation of cathode electrode> of the above-mentioned [[Example•Comparative Example Group I].

[Preparation of Non-Aqueous Liquid Electrolyte]

[Specific carbonate], [other compound] and [specific component] described in [Example] and [Comparative Example] of Table II-1 to II-6 appearing later were mixed in a ratio specified in the Table. LiPF$_6$ was dissolved as electrolyte salt at a concentration of 1 mol·dm$^{-3}$ to prepare the non-aqueous liquid electrolyte (non-aqueous liquid electrolyte of Examples II-1 to II-28 and Comparative Examples II-1 to II-14).

[Preparation of Coin-Type Cell]

By using the above cathode electrode and anode electrode, and the non-aqueous liquid electrolyte prepared in each Example and Comparative Example, the coin-type cell (non-aqueous liquid electrolyte secondary battery of Examples II-1 to II-28 and Comparative Examples II-1 to II-14) was prepared by the same procedure as described in [Preparation of coin-type cell] of the above-mentioned [Example•Comparative Example Group I].

[Evaluation of Coin-Type Cell (Discharge Capacity and Discharge Capacity Retention)]

For the coin-type cell obtained above (non-aqueous liquid electrolyte secondary battery of Examples II-1 to II-28 and Comparative Examples II-1 to II-14), discharge capacity at the 1st cycle and the 10th cycle was measured by the same procedure as described above in [Evaluation of coin-type cell] of Example•Comparative Example Group I]. Discharge capacity retention at the 10th cycle was calculated according to the following formula.

discharge capacity retention (%)=100*(discharge capacity at the 10th cycle)/(discharge capacity at the 1st cycle)     [Mathematical Formula 2]

Discharge capacity at the 1st and 10th cycle and discharge capacity retention (%) at the 10th cycle obtained for the coin-type cell of each example and comparative example are shown in the column [battery evaluation] of Tables II-1 to II-6 below. Values of discharge capacity shown in Tables II-1 to II-6 indicate capacity per unit weight of anode electrode active material (mAh·g$^{-1}$). Herein, "wt %" indicates "weight %", and "vt %" indicates "volume %".

[Table 2]

TABLE II-1

| | | non-aqueous liquid electrolyte | | | battery evaluation | | |
|---|---|---|---|---|---|---|---|
| | negative electrode | specific carbonate (concentration) | other compound (concentration) | specific compound (II) (concentration) | discharge capacity at the 1st cycle (mAh·g−1) | discharge capacity at the 10th cycle (mAh·g−1) | discharge capacity retention rate (%) |
| Example II-1 | Si alloy | fluoroethylene carbonate (5 wt %) | ethylene carbonate + diethyl carbonate (34 wt % + 59 wt %) | bis(trimethylsilyl)sulfate (2 wt %) | 631 | 571 | 90.5 |
| Example II-2 | Si alloy | fluoroethylene carbonate (5 wt %) | ethylene carbonate + diethyl carbonate (34.5 wt % + 59.5 wt %) | bis(trimethylsilyl)sulfate (1 wt %) | 627 | 560 | 89.3 |
| Example II-3 | Si alloy | fluoroethylene carbonate | diethyl carbonate (59 wt %) | bis(trimethylsilyl)sulfate (2 wt %) | 640 | 610 | 95.3 |
| Example II-4 | Si alloy | fluoroethylene carbonate (20 wt %) | ethylene carbonate + diethyl carbonate (17.5 wt % + 60.5 wt %) | bis(trimethylsilyl)sulfate (2 wt %) | 638 | 595 | 93.3 |
| Example II-5 | Si alloy | vinylene carbonate (5 wt %) | ethylene carbonate + diethyl carbonate (34 wt % + 59 wt %) | bis(trimethylsilyl)sulfate (2 wt %) | 622 | 535 | 86 |
| Example II-6 | Si alloy | 4,5-difluoroethylene carbonate (5 wt %) | ethylene carbonate + diethyl carbonate (34 wt % + 59 wt %) | bis(trimethylsilyl)sulfate (2 wt %) | 636 | 590 | 92.7 |
| Example II-7 | Si alloy | fluoroethylene carbonate + vinylene carbonate | diethyl carbonate (58 wt %) | bis(trimethylsilyl)sulfate (2 wt %) | 643 | 614 | 95.5 |
| Example II-8 | Si alloy | fluoroethylene carbonate + vinylethylene carbonate (38 wt % + 2 wt %) | diethyl carbonate (58 wt %) | bis(trimethylsilyl)sulfate (2 wt %) | 642 | 612 | 95.4 |

[Table 3]

TABLE II-2

| | | non-aqueous liquid electrolyte | | | battery evaluation | | |
|---|---|---|---|---|---|---|---|
| | negative electrode | specific carbonate (concentration) | other compound (concentration) | specific compound (II) (concentration) | discharge capacity at the 1st cycle (mAh·g−1) | discharge capacity at the 10th cycle (mAh·g−1) | discharge capacity retention rate (%) |
| Example II-9 | Si alloy | fluoroethylene carbonate (5 wt %) | ethylene carbonate + diethyl carbonate (34 wt % + 59 wt %) | bis(trimethylsilyl)sulfate (2 wt %) | 629 | 564 | 89.6 |

TABLE II-2-continued

|  | negative electrode | non-aqueous liquid electrolyte ||| battery evaluation |||
|---|---|---|---|---|---|---|---|
|  |  | specific carbonate (concentration) | other compound (concentration) | specific compound (II) (concentration) | discharge capacity at the 1st cycle (mAh · g − 1) | discharge capacity at the 10th cycle (mAh · g − 1) | discharge capacity retention rate (%) |
| Example II-10 | Si alloy | 4,5-difluoroethylene carbonate (5 wt %) | ethylene carbonate + diethyl carbonate (34 wt % + 59 wt %) | bis(trimethylsilyl)sulfate (2 wt %) | 631 | 573 | 90.8 |
| Example II-11 | Si alloy | fluoroethylene carbonate | diethyl carbonate (59 wt %) | bis(trimethylsilyl)sulfate (2 wt %) | 634 | 589 | 92.9 |
| Example II-12 | Si alloy | fluoroethylene carbonate + vinylene carbonate (38 wt % + 2 wt %) | diethyl carbonate (58 wt %) | bis(trimethylsilyl)sulfate (2 wt %) | 640 | 602 | 94 |
| Example II-13 | Si alloy | fluoroethylene carbonate (5 wt %) | ethylene carbonate + diethyl carbonate (34 wt % + 59 wt%) | bis[tris(2,2,2-triethyl)]silylsulfate (2 wt %) | 636 | 578 | 90.9 |
| Example II-14 | Si alloy | 4,5-difluoroethylene carbonate (5 wt %) | ethylene carbonate + diethyl carbonate (34 wt % + 59 wt %) | bis[tris(2,2,2-triethyl)]silylsulfate (2 wt %) | 639 | 589 | 92.2 |
| Example II-15 | Si alloy | fluoroethylene carbonate | diethyl carbonate (59 wt %) | bis[tris(2,2,2-triethyl)]silylsulfate (2 wt %) | 642 | 609 | 95 |
| Example II-16 | Si alloy | fluoroethylene carbonate + vinylethylene carbonate (38 wt % + 2 wt %) | diethyl carbonate (58 wt %) | bis[tris(2,2,2-triethyl)]silylsulfate (2 wt %) | 645 | 616 | 95 |

[Table 4]

TABLE II-3

|  | negative electrode | non-aqueous liquid electrolyte ||| battery evaluation |||
|---|---|---|---|---|---|---|---|
|  |  | specific carbonate (concentration) | other compound (concentration) | specific compound (II) (concentration) | discharge capacity at the 1st cycle (mAh · g − 1) | discharge capacity at the 10th cycle (mAh · g − 1) | discharge capacity retention rate (%) |
| Example II-17 | Si alloy | fluoroethylene carbonate (5 wt %) | ethylene carbonate + diethyl carbonate (34 wt % + 59 wt %) | bis(trimethylsilyl)sulfite (2 wt %) | 634 | 574 | 90.5 |
| Example II-18 | Si alloy | 4,5-difluoroethylene carbonate (5 wt %) | ethylene carbonate + diethyl carbonate (34.5 wt % + 59.5 wt %) | bis(trimethylsilyl)sulfite (2 wt %) | 636 | 588 | 92.4 |
| Example II-19 | Si alloy | fluoroethylene carbonate | diethyl carbonate (59 wt %) | bis(trimethylsilyl)sulfite (2 wt %) | 640 | 603 | 94.2 |
| Example II-20 | Si alloy | fluoroethylene carbonate + vinylethylene carbonate (38 wt % + 2 wt %) | diethyl carbonate (58 wt %) | bis(trimethylsilyl)sulfite (2 wt %) | 643 | 610 | 94.9 |
| Example II-21 | Si alloy | none | ethylene carbonate + diethyl carbonate (36 wt % + 62 wt %) | bis(trimethylsilyl)sulfite (2 wt %) | 618 | 510 | 82.5 |

[Table 5]

TABLE II-4

| | | non-aqueous liquid electrolyte | | | battery evaluation | | |
|---|---|---|---|---|---|---|---|
| | | | | | discharge capacity at the | discharge capacity at the | discharge capacity |
| | negative electrode | specific carbonate (concentration) | other compound (concentration) | specific compound (II) (concentration) | 1st cycle (mAh · g − 1) | 10th cycle (mAh · g − 1) | retention rate (%) |
| Example II-22 | Si alloy | none | ethylene carbonate + ethylmethyl carbonate (30 vt % + 70 vt %) | bis(trimethylsilyl)sulfate (2 wt %) | 620 | 580 | 93.6 |
| Example II-23 | Si alloy | none | ethylene carbonate + ethylmethyl carbonate (30 vt % + 70 vt %) | bis(trimethylsilyl)sulfate (4 wt %) | 628 | 592 | 94.3 |
| Example II-24 | Si alloy | none | ethylene carbonate + ethylmethyl carbonate (30 vt % + 70 vt %) | bis(trimethylsilyl)sulfate (2 wt %) | 615 | 571 | 92.8 |
| Example II-25 | Si alloy | none | ethylene carbonate + ethylmethyl carbonate (30 vt % + 70 vt %) | bis[tris(2,2,2-trifluoroethyl)]silylsulfate (2 wt %) | 608 | 571 | 93.9 |
| Example II-26 | Si alloy | none | ethylene carbonate + ethylmethyl carbonate (30 vt % + 70 vt %) | bis(trimethylsilyl)sulfite (2 wt %) | 605 | 559 | 92.4 |
| Example II-27 | Si alloy | vinylene carbonate (2 wt %) | ethylene carbonate + ethylmethyl carbonate (30 vt % + 70 vt %) | bis(trimethylsilyl)sulfate (2 wt %) | 618 | 567 | 91.8 |
| Example II-28 | Si alloy | vinylene carbonate (2 wt %) | ethylene carbonate + ethylmethyl carbonate (30 vt % + 70 vt %) | bis(trimethylsilyl)sulfite (2 wt %) | 603 | 553 | 91.7 |

[Table 6]

TABLE II-5

| | | non-aqueous liquid electrolyte | | | battery evaluation | | |
|---|---|---|---|---|---|---|---|
| | | | | | discharge capacity at the | discharge capacity at the | discharge capacity |
| | negative electrode | specific carbonate (concentration) | other compound (concentration) | specific compound (II) (concentration) | 1st cycle (mAh · g − 1) | 10th cycle (mAh · g − 1) | retention rate (%) |
| Comparative Example II-1 | Si alloy | fluoroethylene carbonate (5 wt %) | ethylene carbonate + diethyl carbonate (35 wt % + 60 wt %) | none | 615 | 494 | 80.3 |
| Comparative Example II-2 | Si alloy | vinylene carbonate (5 wt %) | ethylene carbonate + diethyl carbonate (35 wt % + 60 wt %) | none | 611 | 455 | 74.5 |
| Comparative Example II-3 | Si alloy | none | ethylene carbonate + diethyl carbonate (37 wt % + 63 wt %) | none | 601 | 341 | 56.7 |
| Comparative Example II-4 | graphite | none | ethylene carbonate + diethyl carbonate (37 wt % + 63 wt %) | none | 338 | 274 | 81.2 |
| Comparative Example II-5 | graphite | none | ethylene carbonate + diethyl carbonate (36 wt % + 62 wt %) | bis(trimethylsilyl)sulfite (2 wt %) | 332 | 269 | 81 |
| Comparative Example II-6 | graphite | vinylene carbonate (5 wt %) | ethylene carbonate + diethyl carbonate (35 wt % + 60 wt %) | none | 342 | 301 | 88 |
| Comparative Example II-7 | graphite | fluoroethylene carbonate (5 wt %) | ethylene carbonate + diethyl carbonate (34 wt % + 59 wt %) | bis(trimethylsilyl)sulfite (2 wt %) | 335 | 255 | 71.8 |
| Comparative Example II-8 | graphite | fluoroethylene carbonate | diethyl carbonate (59 wt %) | bis(trimethylsilyl)sulfite (2 wt %) | 333 | 226 | 67.8 |

[Table 7]

TABLE 11-6

| | | non-aqueous liquid electrolyte | | | battery evaluation | | |
|---|---|---|---|---|---|---|---|
| | | | | | discharge capacity at the | discharge capacity at the | discharge capacity |
| | negative electrode | specific carbonate (concentration) | other compound (concentration) | specific compound (II) (concentration) | 1st cycle (mAh · g − 1) | 10th cycle (mAh · g − 1) | retention rate (%) |
| Comparative Example II-9 | Si alloy | none | ethylene carbonate + ethylmethyl carbonate (30 vt % + 70 vt %) | none | 603 | 537 | 89.1 |
| Comparative Example II-10 | Si alloy | vinylene carbonate (2 wt %) | ethylene carbonate + ethylmethyl carbonate (30 vt % + 70 vt %) | none | 612 | 550 | 89.9 |
| Comparative Example II-11 | graphite | none | ethylene carbonate + ethylmethyl carbonate (30 vt % + 70 vt %) | none | 345 | 342 | 99.2 |
| Comparative Example II-12 | graphite | vinylene carbonate (2 wt %) | ethylene carbonate + ethylmethyl carbonate (30 vt % + 70 vt %) | none | 348 | 347 | 99.7 |
| Comparative Example II-13 | graphite | none | ethylene carbonate + ethylmethyl carbonate (30 vt % + 70 vt %) | bis(trimethylsilyl)sulfate (2 wt %) | 342 | 337 | 98.6 |
| Comparative Example II-14 | graphite | vinylene carbonate (2 wt %) | ethylene carbonate + ethylmethyl carbonate (30 vt % + 70 vt %) | bis(trimethylsilyl)sulfate (2 wt %) | 344 | 340 | 98.9 |

The results shown in Tables II-1 to II-6 above indicate the following.

In Examples II-1 to II-20, II-27 and II-28, in which specific compound (II) and the specific carbonate are contained in the non-aqueous liquid electrolyte, the discharge capacity retention after the cycle test is remarkably improved in comparison with Comparative Example II-3, in which neither specific compound (II) nor specific carbonate is contained in the non-aqueous liquid electrolyte.

Further, in Examples II-21 to II-26, in which the non-aqueous liquid electrolyte contains only specific compound (II) and not specific carbonate, the discharge capacity retention after the cycle test is remarkably improved also in comparison with comparative example II-3, although the degree of improvement is a little less than that observed in the above Examples II-1 to II-20, II-27 and II-28.

On the other hand, in Comparative Examples II-1 and II-2 where the non-aqueous liquid electrolyte contains the specific carbonate but not specific compound(II), the discharge capacity retention increases but the degree of the increase is far less than that observed in Examples II-1 to II-20, II-27 and II-28.

In Comparative Examples II-4 to II-8 and II-11 to II-14, only carbon material is used as anode electrode active material and in Comparative Examples II-4, II-9 and II-11, the non-aqueous liquid electrolyte contains neither specific compound (II) nor specific carbonate. In Comparative Example II-5, the non-aqueous liquid electrolyte contains only specific compound (II) and not specific carbonate. Comparison in discharge capacity retention between Comparative Example II-4 and comparative example II-5 indicates that inclusion of specific compound (II) does not affect discharge capacity retention.

The non-aqueous liquid electrolyte in Comparative Examples II-6, II-10 and II-12 contains the specific carbonate but not specific compound (II). Comparison in discharge capacity retention between Comparative Examples II-4, II-9, II-11 and Comparative Examples II-6, II-10, II-12 indicates that inclusion of the specific carbonate improves discharge capacity retention.

On the other hand, comparison between Comparative Examples II-7, II-8, II-14, whose non-aqueous liquid electrolyte contains both the specific compound (II) and the specific carbonate, and Comparative Examples II-4, II-9, II-11, whose non-aqueous liquid electrolyte contains neither specific compound (II) or the specific carbonate, indicates that discharge capacity retention is worse in the former.

Discharge capacity in Examples II-1 to II-20, II-27, II-28, where anode electrode active material consists of silicon alloy, is higher than that in Comparative Examples II-4 to II-8, II-11 to II-14, where anode electrode active material consists of carbon material alone. And, as mentioned above, when anode electrode active material consists of carbon material, inclusion of either the specific carbonate or specific compound (II) in the non-aqueous liquid electrolyte improves discharge capacity retention. However, when specific compound (II) and the specific carbonate are both included, discharge capacity retention is lower than when none of these compound is included or when either one of these compounds is included.

On the other hand, when anode electrode active material consists of silicon alloy, a battery, based on the non-aqueous liquid electrolyte containing only specific compound (II) and not the specific carbonate, has lower discharge capacity retention than a battery, based on the non-aqueous liquid electrolyte containing neither of these compounds. However, a battery based on the non-aqueous liquid electrolyte containing both specific compound (II) and specific carbonate shows higher discharge capacity retention.

[Example•Comparative Example Group III]

[Examples III-1 to III-19 and Comparative Examples III-1 to III-7]

The non-aqueous liquid electrolyte secondary battery was assembled by the following procedure and its performance was evaluated. The results are shown in Table III-1 and III-2.

[Preparation of Anode Electrode]

<Preparation of Silicon Alloy Anode Electrode: Examples III-1 to II-11, Comparative Examples II-1 to II-4>

The anode electrode (silicon alloy anode electrode) was prepared by the same method as described in the section <Preparation of silicon alloy anode electrode> of the above-mentioned [Example•Comparative Example Group I].

<Preparation of Graphite Anode Electrode: Examples III-12 to II-19, Comparative Examples II-5 to II-7>

The anode electrode (graphite anode electrode) was prepared by the same method as described in the column <Preparation of graphite anode electrode> of the above-mentioned [Example•Comparative Example Group I].

[Preparation of Cathode Electrode]

The cathode electrode was prepared by the same method as described in the column <Preparation of cathode electrode> of the above-mentioned [Example•Comparative Example Group I].

[Preparation of Non-Aqueous Liquid Electrolyte]

[Specific compound (III)] and [Specific carbonate] described in [Example] and [Comparative Example] of Tables III-1 and III-2 appearing later were mixed in a ratio specified in the Table. $LiPF_6$ was dissolved further as electrolyte salt at a concentration of 1 mol·dm$^{-3}$ to prepare the non-aqueous liquid electrolyte (non-aqueous liquid electrolyte of Examples III-1 to III-19 and Comparative Examples III-1 to III-7).

[Preparation of Coin-Type Cell]

By using the cathode electrode, anode electrode, and non-aqueous liquid electrolyte prepared in each Example and Comparative Example, the coin-type cell (non-aqueous liquid electrolyte secondary battery of Examples III-1 to III-19 and Comparative Examples III-1 to III-7) was prepared by the same procedure as described in [Preparation of coin-type cell] of the above-mentioned [Example•Comparative Example Group I].

[Evaluation of Coin-Type Cell (Discharge Capacity and Discharge Capacity Retention)]

For the non-aqueous liquid electrolyte secondary battery obtained in Examples III-1 to III-11 and Comparative Examples III-1 to III-4 (coin-type cell), discharge capacity at the 1st cycle and the 100th cycle was measured by the same procedure as described above in [Evaluation of coin-type cell] of [Example•Comparative Example Group I]. Discharge capacity retention at the 100th cycle was calculated according to the following formula.

discharge capacity retention (%)=100*(discharge capacity at the 100th cycle)/(discharge capacity at the 1st cycle)     [Mathematical Formula 3]

Further, for the non-aqueous liquid electrolyte secondary battery obtained in Examples III-12 to III-19 and Comparative Examples III-5 to III-7 (coin-type cell), discharge capacity at the 1st cycle and the 10th cycle was measured by the same procedure as described above in [Evaluation of coin-type cell] of [Example•Comparative Example Group I]. Discharge capacity retention at the 10th cycle was calculated according to the following formula.

discharge capacity retention (%)=100*(discharge capacity at the 10th cycle)/(discharge capacity at the 1st cycle)     [Mathematical Formula 4]

Discharge capacity retention at the 100th cycle (%) obtained for the coin-type cell of each example and comparative example is shown in the column [battery evaluation] of Tables III-1 and III-2. Values of discharge capacity shown in Tables II-1 and II-2 indicate capacity per unit weight of anode electrode active material (mAh·g$^{-1}$). Herein, "wt %" indicates "weight %".

[Table 8]

TABLE III-1

| | | non-aqueous liquid electrolyte | | | | battery evaluates |
|---|---|---|---|---|---|---|
| | specific compound (III) | | specific carbonate | | negative | discharge capacity |
| | structure | amount | name | amount | electrode | at the 100th cycle |
| Example III-1 | 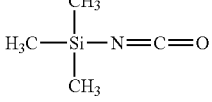 | 2 wt % | vinylene carbonate | 2 wt % | graphite | 92% |
| Example III-2 | 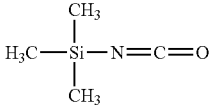 | 4 wt % | vinylene carbonate | 2 wt % | graphite | 93% |
| Example III-3 | 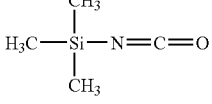 | 2 wt % | vinylene carbonate | 4 wt % | graphite | 95% |
| Example III-4 | 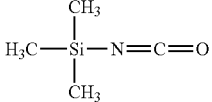 | 2 wt % | vinylethylene carbonate | 2 wt % | graphite | 90% |

TABLE III-1-continued

| | non-aqueous liquid electrolyte | | | | negative electrode | battery evaluates discharge capacity at the 100th cycle |
|---|---|---|---|---|---|---|
| | specific compound (III) | | specific carbonate | | | |
| | structure | amount | name | amount | | |
| Example III-5 | $H_3C-\underset{\underset{CH_3}{|}}{\overset{\overset{CH_3}{|}}{Si}}-N=C=O$ | 2 wt % | fluoroethylene carbonate | 2 wt % | graphite | 90% |
| Example III-6 | $H_3C-\underset{\underset{CH_3}{|}}{\overset{\overset{CH_3}{|}}{Si}}-N=C=O$ | 2 wt % | difluoroethylene carbonate | 2 wt % | graphite | 90% |
| Example III-7 | $H_3C-\underset{\underset{CH_3}{|}}{\overset{\overset{CH_3}{|}}{Si}}-N=C=O$ | 2 wt % | vinylene carbonate + vinylethylene carbonate | 2 wt % + 2 wt % | graphite | 93% |
| Example III-8 | $H_3C-\underset{\underset{CH_3}{|}}{\overset{\overset{CH_3}{|}}{Si}}-N=C=O$ | 2 wt % | vinylene carbonate + fluoroethylene carbonate | 2 wt % + 2 wt % | graphite | 94% |
| Example III-9 | $H_3C-\underset{\underset{CH_3}{|}}{\overset{\overset{CH_3}{|}}{Si}}-N=C=O$ | 2 wt % | vinylene carbonate + difluoroethylene carbonate | 2 wt % + 2 wt % | graphite | 94% |
| Example III-10 | $C_2H_5-C(=O)-N=C=O$ | 2 wt % | vinylene carbonate | 2 wt % | graphite | 93% |
| Example III-11 | $H_3C-C(=O)-N=C=O$ | 2 wt % | vinylene carbonate | 2 wt % | graphite | 92% |
| Comparative Example III-1 | — | — | vinylene carbonate | 2 wt % | graphite | 88% |
| Comparative Example III-2 | — | — | vinylene carbonate + vinylethylene carbonate | 2 wt % + 2 wt % | graphite | 89% |
| Comparative Example III-3 | $H_3C-\underset{\underset{CH_3}{|}}{\overset{\overset{CH_3}{|}}{Si}}-N=C=O$ | | — | — | graphite | 79% |
| Comparative Example III-4 | $C_2H_5-C(=O)-N=C=O$ | | — | — | graphite | 75% |

TABLE III-2

| | non-aqueous liquid electrolyte | | | | negative electrode | battery evaluation discharge capacity at the 10th cycle |
|---|---|---|---|---|---|---|
| | specific compound (III) | | specific carbonate | | | |
| | structure | amount | name | amount | | |
| Example III-12 | 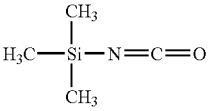 | 2 wt % | vinylene carbonate | 2 wt % | Si alloy | 93.5% |
| Example III-13 | 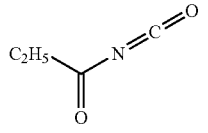 | 2 wt % | vinylene carbonate | 2 wt % | Si alloy | 94.8% |
| Example III-14 | 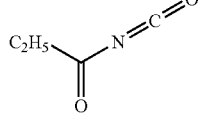 | 2 wt % | fluoroethylene carbonate | 2 wt % | Si alloy | 94.3% |
| Example III-15 | 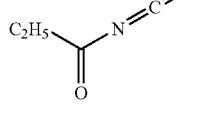 | 2 wt % | difluoroethylene carbonate | 2 wt % | Si alloy | 94.5% |
| Example III-16 | 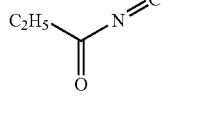 | 2 wt % | fluoroethylene carbonate | 30 wt % | Si alloy | 96.5% |
| Example III-17 | 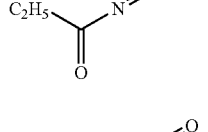 | 2 wt % | difluoroethylene carbonate | 30 wt % | Si alloy | 96.3% |
| Example III-18 | 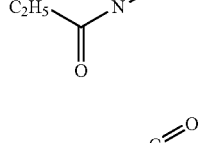 | 2 wt % | vinylene carbonate + fluoroethylene carbonate | 2 wt % | Si alloy | 95.9% |
| Example III-19 | 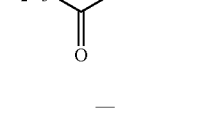 | 2 wt % | vinylene carbonate + difluoroethylene carbonate | 2 wt % | Si alloy | 96.1% |
| Comparative Example III-5 | — | — | vinylene carbonate | 2 wt % | Si alloy | 89.9% |
| Comparative Example III-6 | — | — | vinylene carbonate + vinylethylene carbonate | 2 wt % + 2 wt % | Si alloy | 91.2% |

TABLE III-2-continued

| | non-aqueous liquid electrolyte | | | | negative electrode | battery evaluation discharge capacity at the 10th cycle |
|---|---|---|---|---|---|---|
| | specific compound (III) | | specific carbonate | | | |
| | structure | amount | name | amount | | |
| Comparative Example III-7 | 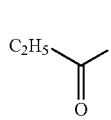 | 2 wt % | — | — | Si alloy | 89.2% |

The results shown in Tables III-1 and III-2 above indicate the following.

When graphite is used in the anode electrode, it is evident that Examples III-1 to III-11, in which specific compound (III) and the specific carbonate are contained in the non-aqueous liquid electrolyte, give rise to a higher discharge capacity retention and better cycle characteristics than Comparative Examples III-1 to III-4.

Similar trend is also observed in the comparison between Examples III-12 to III-19 and Comparative Examples III-5 to III-7, where silicon alloy is used in the anode electrode.

INDUSTRIAL APPLICABILITY

The non-aqueous liquid electrolyte secondary battery of the present invention is excellent in long-term charge-discharge cycle characteristics and, therefore, can be used as power source of notebook personal computers, pen-input personal computers, mobile computers, electronic book players, cellular phones, portable facsimiles, portable copiers, portable printers, headphone stereos, video movies, liquid crystal televisions, handy cleaners, portable CD players, mini disc players, transceivers, electronic databooks, electronic calculators, memory cards, portable tape recorders, radios, backup power sources, motors, illuminators, toys, game machines, watches, stroboscopes, cameras, load leveling of power etc. and can also be used for electric bicycle, electric scooter, electric car etc.

Although the present invention was explained in detail referring to certain embodiments, it is evident for those skilled in the art that various changes or modifications can be made thereto without departing from the spirit and scope of the present invention.

The present application is based on Japanese Patent Application (Patent Application No. 2004-326672) filed on Nov. 10, 2004, Japanese Patent Application (Patent Application No. 2005-055337) filed on Mar. 1, 2005 and Japanese patent Application (Patent Application No. 2005-183846) filed on Jun. 23, 2005, and their entireties are incorporated by reference.

The invention claimed is:

1. A non-aqueous liquid electrolyte to be used for a non-aqueous liquid electrolyte secondary battery comprising a anode electrode and a cathode electrode, capable of intercalating and deintercalating lithium ions, and the non-aqueous liquid electrolyte, wherein said non-aqueous liquid electrolyte contains, at least, a carbonate having at least either an unsaturated bond or a halogen atom, and a compound of formula (III-1)

$$A-N=C= \quad (III-1)$$

wherein in formula (III-1), A represents an element or group other than a hydrogen wherein said compound of formula (III-1) is selected from the group consisting of a compound of formula (III-2)

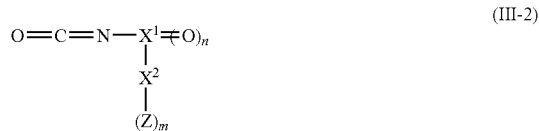

wherein in formula (III-2), $X^1$ and $X^2$ represent, independently of each other, an element other than hydrogen, Z represents an arbitrary element or group, m and n represent, independently of each other, an integer greater than or equal to 1, and when m is 2 or greater, each of Z may be the same or different from each other and a compound of formula (III-3)

wherein in formula (III-3),

R represents, independently of each other, an alkyl group or aryl group that may have a substituent. In addition, more than one R may be connected to each other to form a ring.

2. The non-aqueous liquid electrolyte as defined in claim 1, wherein said compound of formula (III-1) is a compound of formula (III-2)

wherein in formula (III-2), $X^1$ and $X^2$ represent, independently of each other, an element other than hydrogen, Z represents an arbitrary element or group, m and n represent, independently of each other, an integer greater than or equal to 1, and when m is 2 or greater, each of Z may be the same or different from each other.

3. The non-aqueous liquid electrolyte as defined in claim 1, wherein said compound of formula (III-1) is a compound of formula (III-3)

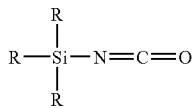
(III-3)

wherein in formula (III-3),

R represents, independently of each other, an alkyl group or aryl group that may have a substituent. In addition, more than one R may be connected to each other to form a ring.

4. The non-aqueous liquid electrolyte as defined in claim 1, wherein in said non-aqueous liquid electrolyte, the concentration of said compound represented by formula (III-1) is 0.01 weight % or higher, and 10 weight % or lower.

5. A non-aqueous liquid electrolyte secondary battery comprising an anode electrode and a cathode electrode, capable of intercalating and deintercalating lithium ions, and a non-aqueous liquid electrolyte, wherein said non-aqueous liquid electrolyte is a non-aqueous liquid electrolyte defined in claim 1.

6. The non-aqueous liquid electrolyte as defined in claim 1, wherein the anode electrode contains an anode electrode active material comprising at least one kind of atom selected from the group consisting of Si atom, Sn atom and Pb atom.

7. The non-aqueous liquid electrolyte as defined in claim 6, wherein said compound of formula (III-1) is a compound of formula (III-2)

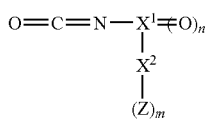
(III-2)

wherein in formula (III-2), $X^1$ and $X^2$ represent, independently of each other, an element other than hydrogen, Z represents an arbitrary element or group, m and n represent, independently of each other, an integer greater than or equal to 1, and when m is 2 or greater, each of Z may be the same or different from each other.

8. The non-aqueous liquid electrolyte as defined in claim 6, wherein said compound of formula (III-1) is a compound of formula (III-3)

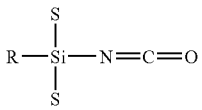
(III-3)

wherein in formula (III-3), R represents, independently of each other, an alkyl group or aryl group that may have a substituent and more than one R may be connected to each other to form a ring.

9. The non-aqueous liquid electrolyte as defined in claim 6, wherein in said non-aqueous liquid electrolyte, the concentration of said compound represented by formula (III-1) is 0.01 weight % or higher, and 10 weight % or lower.

10. The non-aqueous liquid electrolyte as defined in claim 6, wherein in said non-aqueous liquid electrolyte, the concentration of said carbonate having at least either an unsaturated bond or a halogen atom is 0.01 weight % or higher, and 70 weight % or lower.

11. The non-aqueous liquid electrolyte as defined in claim 6, wherein said carbonate having an unsaturated bond or a halogen atom is one or more carbonate compounds selected from the group consisting of vinylene carbonate, vinylethylene carbonate, fluoroethylene carbonate, difluoroethylene carbonate and derivatives of these carbonate compounds.

12. The non-aqueous liquid electrolyte as defined in claim 6, further comprising ethylene carbonate and/or propylene carbonate.

13. The non-aqueous liquid electrolyte as defined in claim 6, further comprising at least one additional carbonate selected from the group consisting of dimethyl carbonate, ethylmethyl carbonate, diethyl carbonate, methyl-n-propyl carbonate, ethyl-n-propyl carbonate and di-n-propyl carbonate.

* * * * *